(12) United States Patent
Husar et al.

(10) Patent No.: US 11,108,850 B2
(45) Date of Patent: Aug. 31, 2021

(54) TRIANGULATING STATEFUL CLIENT REQUESTS FOR WEB APPLICATIONS

(71) Applicant: Red Hat, Inc., Raleigh, NC (US)

(72) Inventors: Radoslav Husar, Brno (CZ); Paul Marcus Ferraro, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 43 days.

(21) Appl. No.: 16/531,992

(22) Filed: Aug. 5, 2019

(65) Prior Publication Data

US 2021/0044651 A1  Feb. 11, 2021

(51) Int. Cl.
  *H04L 29/08* (2006.01)
  *H04L 29/06* (2006.01)

(52) U.S. Cl.
  CPC .......... *H04L 67/1002* (2013.01); *H04L 67/02* (2013.01); *H04L 67/146* (2013.01); *H04L 67/42* (2013.01)

(58) Field of Classification Search
  CPC .. G06F 16/27; G06F 16/2365; G06F 11/1658; G06F 11/2007; H04L 67/1097; H04L 47/125; H04L 67/1095; H04L 67/1002; H04L 67/02; H04L 67/146; H04L 67/42
  See application file for complete search history.

(56) References Cited

U.S. PATENT DOCUMENTS

| | | | |
|---|---|---|---|
| 8,341,294 B2 | 12/2012 | Ralev | |
| 9,344,494 B2 | 5/2016 | Mordani et al. | |
| 2005/0144511 A1* | 6/2005 | Chih | G06F 11/2005 714/5.1 |
| 2006/0053087 A1* | 3/2006 | Pavlov | G06F 8/61 |
| 2006/0143224 A1* | 6/2006 | Simeonov | G06F 9/4493 |
| 2007/0288526 A1* | 12/2007 | Mankad | G06F 11/1662 |
| 2008/0016014 A1* | 1/2008 | Sigal | G06N 3/02 706/15 |
| 2008/0281708 A1* | 11/2008 | Deal | G06Q 30/0269 705/14.53 |

(Continued)

FOREIGN PATENT DOCUMENTS

DE  102004059754 A1 * 7/2005  ............ G06F 11/201

*Primary Examiner* — Ninos Donabed
(74) *Attorney, Agent, or Firm* — Withrow & Terranova, PLLC

(57) ABSTRACT

Triangulating stateful client requests for web applications is disclosed. In one example, a computing system includes a load-balancing device and a cluster of interconnected processor-based nodes. When the load-balancing device receives a client request, the load-balancing device adds a client request identifier to the client request. Upon determining that a primary session node for the client request is unavailable, the load-balancing device sends the client request to an "unaffiliated" processor-based node, which identifies a secondary session node for the client request and sends the client request to the secondary session node. The secondary session node services the client request and generates a response that includes the client request identifier added to the client request by the load-balancing device. The secondary session node sends the response back to the load-balancing device, which uses the client request identifier in the response to correlate the response with the original client request.

17 Claims, 19 Drawing Sheets

(56) References Cited

U.S. PATENT DOCUMENTS

| | | | |
|---|---|---|---|
| 2010/0223364 A1 | 9/2010 | Wei | |
| 2013/0054822 A1* | 2/2013 | Mordani | H04L 69/40 709/228 |
| 2014/0047014 A1* | 2/2014 | Watanabe | H04L 67/1027 709/203 |
| 2015/0269042 A1* | 9/2015 | Jain | H04L 67/1034 714/6.3 |
| 2016/0055185 A1* | 2/2016 | Goel | G06F 40/284 707/744 |
| 2016/0164740 A1* | 6/2016 | Chokshi | H04L 12/4641 370/389 |
| 2017/0193040 A1* | 7/2017 | Agrawal | G06F 16/245 |
| 2018/0007102 A1* | 1/2018 | Klein | H04L 65/1026 |
| 2018/0007204 A1* | 1/2018 | Klein | H04L 67/22 |
| 2018/0007205 A1* | 1/2018 | Klein | H04L 67/42 |
| 2018/0007206 A1* | 1/2018 | Klein | H04L 12/1827 |
| 2018/0011937 A1* | 1/2018 | Tikhonov | G06F 16/335 |
| 2018/0014038 A1* | 1/2018 | Lamburt | G06F 16/9535 |

\* cited by examiner

US 11,108,850 B2

TRIANGULATING STATEFUL CLIENT REQUESTS FOR WEB APPLICATIONS

BACKGROUND

Load balancing is a mechanism by which client requests to a web application are distributed across a cluster of processor-based nodes to improve the scalability and availability of the web application. Conventional load balancing mechanisms may support session affinity, which allows client requests from a particular client to be directed to one or more specific nodes of the cluster that maintain session state for the client.

SUMMARY

The examples disclosed herein relate to triangulating stateful client requests to improve response time. In one example, a computing system, on which a web application is executing, includes a load-balancing device that is communicatively coupled to a cluster of interconnected processor-based nodes. When the load-balancing device receives a client request from a client device via a communications network, the load-balancing device adds a request header, including a client request identifier, to the client request. Upon determining that a primary session node (i.e., a processor-based node within the cluster that maintains a primary copy of the client session data for the client request) is unavailable, the load-balancing device sends the client request to an "unaffiliated" processor-based node that does not store a copy of client session data for the client request. The unaffiliated processor-based node then identifies a secondary session node (i.e., a processor-based node within the cluster that maintains a backup copy of the client session data for the client request), and sends the client request to the secondary session node. The secondary session node services the client request, and generates a response that includes the client request identifier added to the client request by the load-balancing device. The secondary session node sends the response back to the load-balancing device, which uses the client request identifier included in the response to correlate the response with the original client request. The load-balancing device then sends the response to the client device. The client request is thus "triangulated" by being sent from the load-balancing device to the unaffiliated processor-based node, then to the secondary session node, then back to the load-balancing device, instead of requiring the unaffiliated processor-based node to fetch the client session data and service the client request.

In another example, a computing system is provided. The computing system comprises a load-balancing device configured to be communicatively coupled to a cluster comprising a plurality of interconnected processor-based nodes and to a communications network. The load-balancing device is to receive a client request from a client device via the communications network. The load-balancing device is further to add a request header, comprising a client request identifier uniquely corresponding to the client request, to the client request. The load-balancing device is also to determine that a first processor-based node of the plurality of interconnected processor-based nodes is unavailable, wherein the first processor-based node is a primary session node that maintains a primary copy of client session data for the client device. The load-balancing device is additionally to, responsive to determining that the first processor-based node is unavailable, send the client request to a second processor-based node of the plurality of interconnected processor-based nodes, wherein the second processor-based node is unaffiliated with the client session data for the client device.

In another example, a method is provided. The method comprises receiving, by a load-balancing device communicatively coupled to a cluster comprising a plurality of interconnected processor-based nodes and to a communications network, a client request from a client device via the communications network. The method further comprises adding, by the load-balancing device, a request header, comprising a client request identifier uniquely corresponding to the client request, to the client request. The method also comprises determining, by the load-balancing device, that a first processor-based node of the plurality of interconnected processor-based nodes is unavailable, wherein the first processor-based node is a primary session node that maintains a primary copy of client session data for the client device. The method additionally comprises, responsive to determining that the first processor-based node is unavailable, sending, by the load-balancing device, the client request to a second processor-based node of the plurality of interconnected processor-based nodes, wherein the second processor-based node is unaffiliated with the client session data for the client device.

In another example, a computer program product is provided. The computer program product is stored on a non-transitory computer-readable storage medium, and includes instructions to cause a processor device to receive a client request from a client device via a communications network. The instructions further cause the processor device to add a request header, comprising a client request identifier uniquely corresponding to the client request, to the client request. The instructions also cause the processor device to determine that a first processor-based node of a plurality of interconnected processor-based nodes of a cluster is unavailable, wherein the first processor-based node is a primary session node that maintains a primary copy of client session data for the client device. The instructions additionally cause the processor device to, responsive to determining that the first processor-based node is unavailable, send the client request to a second processor-based node of the plurality of interconnected processor-based nodes, wherein the second processor-based node is unaffiliated with the client session data for the client device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
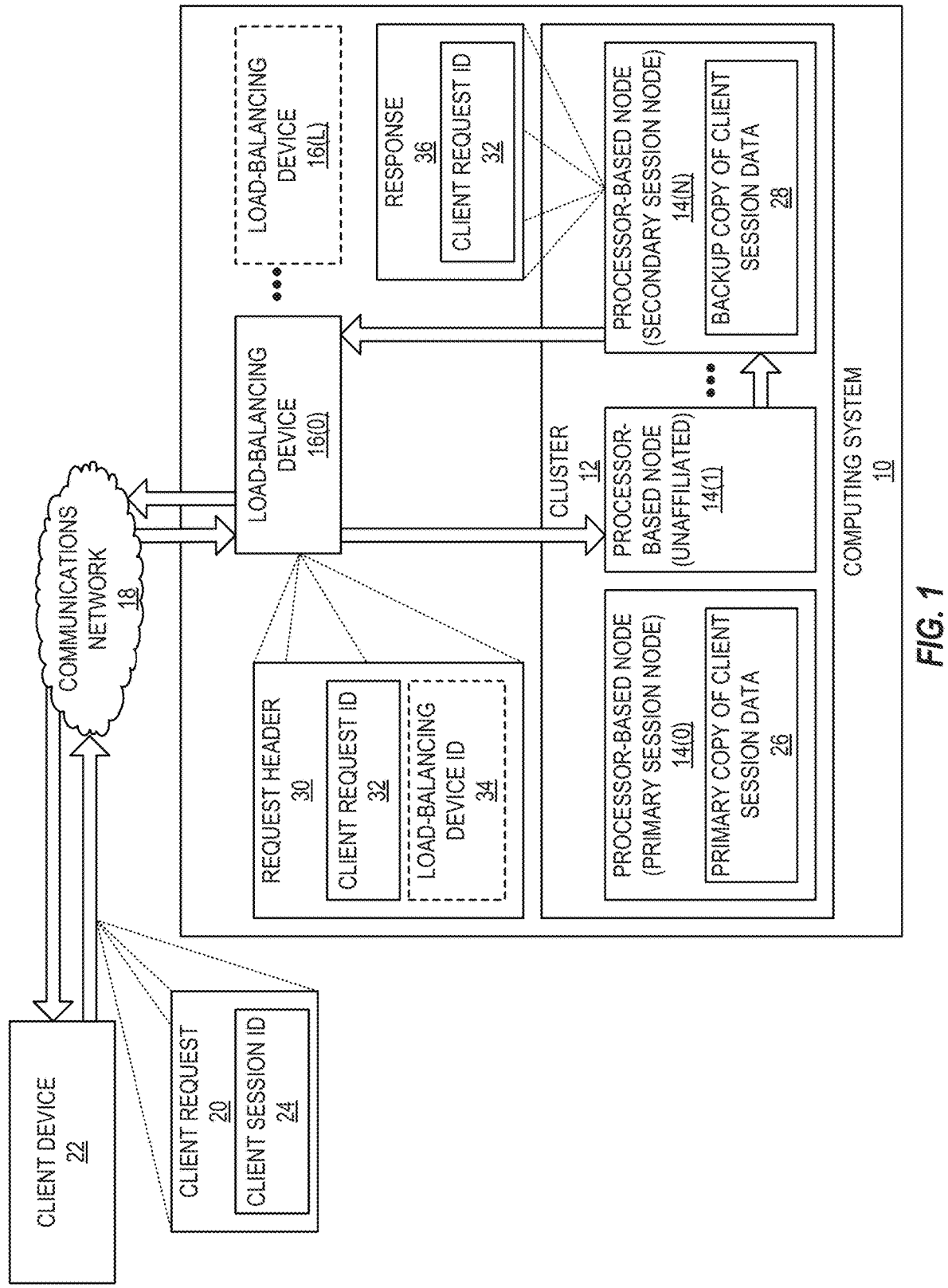
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, "load balancing" refers to a mechanism by which client requests to a web application are distributed by a load-balancing device (or multiple load-balancing devices, according to some examples) across a cluster of processor-based nodes for servicing. Load balancing enables the client requests to be processed in parallel by the processor-based nodes of the cluster, and allows individual processor-based nodes to be added and/or removed from the cluster as needed without requiring the web application to be taken offline. In this manner, the use of load balancing may improve the scalability and availability of the web application.

For web applications that support stateful client sessions (e.g., by maintaining client session data, representing current state of a client session, across multiple client requests), conventional load-balancing mechanisms may also support the concept of "session affinity." Load-balancing devices that support session affinity will associate a given client session with one or more specific processor-based nodes that maintain corresponding client session data, and will direct client requests associated with that client session to those specific processor-based nodes. To further improve availability of the web application, the client session data may be maintained by multiple processor-based nodes (e.g., a primary session node that stores a primary copy of client session data, and one or more secondary session nodes that store backup copies of the client session data). If the primary session node fails or becomes otherwise unavailable, subsequent client requests associated with that client session may be handled by one of the secondary session nodes for that client session.

However, conventional load-balancing mechanisms suffer from a number of shortcomings. In conventional load balancing, the load-balancing device is responsible for making failover decisions (e.g., identifying a processor-based node to which a client request should be directed if a primary session node is unavailable). Frequently, the load-balancing device must make such decisions with no information about how the client session data associated with the client request is maintained by the cluster, or with outdated information that does not accurately reflect the status of the processor-based nodes maintaining the client session data. Consequently, the load-balancing device may direct the client request to a processor-based node that does not maintain the corresponding client session data. That processor-based node then must fetch the client session data from another processor-based node of the cluster, which may incur performance penalties for the web application. The load-balancing device may also select different processor-based nodes to service concurrent client requests for the same client, which may introduce contention over the client session data and negatively impact the scalability of the web application. These issues may be further exacerbated if the servicing of the client request requires acquiring other user-associated data, and/or remote calls to access the client session data.

In this regard, the examples herein relate to computing systems that support triangulation of stateful client requests for web applications. In some examples, a computing system on which a web application is executing includes a load-balancing device and a cluster of interconnected processor-based nodes. Upon receiving a client request from a client device via a communications network, the load-balancing device adds a request header, including a client request identifier, to the client request. If the load-balancing device determines that a primary session node (i.e., a processor-based node within the cluster that maintains a primary copy of the client session data for the client request) is unavailable, the load-balancing device sends the client request to an "unaffiliated" processor-based node that does not store a copy of the client session data for the client request.

The unaffiliated processor-based node then identifies a secondary session node (i.e., a processor-based node within the cluster that maintains a backup copy of the client session data for the client request), and sends the client request to the secondary session node. The secondary session node services the client request and generates a response that includes the client request identifier added to the client request by the load-balancing device. The secondary session node sends the response back to the load-balancing device, which uses the client request identifier included in the response to correlate the response with the original client request. The load-balancing device then sends the response to the client device.

In this manner, the client request is "triangulated," in that it is routed from the load-balancing device to the unaffiliated node, then to the secondary session node, and finally back to the load-balancing device. By triangulating the client request, the computing system avoids the need for the client session data to be remotely fetched by the unaffiliated node, which improves system response time and decreases network and processor loads. Additionally, by sending all asynchronous client requests corresponding to a given client session to the same secondary session node, the computing system reduces contention for the client session data, which further improves scalability of the web application.

FIG. 1 is a block diagram of a computing system 10 in which examples may be practiced. The computing system 10 includes a cluster 12 that comprises a plurality of interconnected processor-based nodes 14(0)-14(N). The processor-based nodes 14(0)-14(N) are communicatively coupled to one or more load-balancing devices 16(0)-16(L), which in turn are communicatively coupled to a communications network 18 such as the internet, a wide-area network (WAN), or a local area network (LAN), as non-limiting examples. It is to be understood that the cluster 12, the processor-based nodes 14(0)-14(N), and/or the one or more load-balancing devices 16(0)-16(L) may include additional constituent elements than those illustrated in FIG. 1.

In the example of FIG. 1, the load-balancing device 16(0) receives a client request 20 from a client device 22 via the communications network 18 (e.g., in the course of accessing a web application (not shown) provided by the computing system 10). The client request 20 is a stateful client request, and thus in this example includes a client session identifier ("CLIENT SESSION ID") 24 that uniquely corresponds to an ongoing client session of the client device 22, and that the computing system 10 can use to associate the client request 20 with the ongoing client session. As seen in FIG. 1, the processor-based node 14(0) has been designated as the primary session node for the client request 20, and as a result stores a primary copy of client session data 26 for the client request 20. Likewise, the processor-based node 14(N) has been designated as the secondary session node for the client request 20, and thus stores a backup copy of the client session data 28 for the client request 20.

Upon receiving the client request 20, the load-balancing device 16(0) adds a request header 30 to the client request 20. The request header 30 includes a client request identifier ("CLIENT REQUEST ID") 32 that uniquely corresponds to the client request 20. In examples in which the computing system 10 includes a plurality of load-balancing devices 16(0)-16(L), the request header 30 may also include a load-balancing device identifier ("LOAD-BALANCING DEVICE ID") 34 that uniquely corresponds to the load-balancing device 16(0).

The load-balancing device 16(0) then determines that the processor-based node 14(0) serving as the primary session node is unavailable. In response, the load-balancing device 16(0) sends the client request 20, including the added request header 30, to the processor-based node 14(1), which is unaffiliated with the client session data for the client device 22. Instead of fetching the backup copy of the client session data 28 from the processor-based node 14(N) serving as the secondary session node as in conventional systems, the processor-based node 14(1) identifies the processor-based node 14(N) as the secondary session node. In some examples, the processor-based node 14(1) identifies the processor-based node 14(N) as the secondary session node based on the client session identifier 24 of the client request 20 (e.g., by applying a deterministic algorithm to the client session identifier 24). The processor-based node 14(1) then sends the client request 20 to the processor-based node 14(N).

The processor-based node 14(N) next uses the backup copy of the client session data 28 to generate a response 36 to the client request 20 (e.g., by using the client session identifier 24 of the client request 20 to access the backup copy of the client session data 28). The response 36 generated by the processor-based node 14(N) includes the client request identifier 32 added to the client request 20 by the load-balancing device 16(0). The processor-based node 14(N) then sends the response 36 to the load-balancing device 16(0). In examples in which the computing system 10 includes multiple load-balancing devices 16(0)-16(L), the processor-based node 14(N) may use the load-balancing device identifier 34 added to the client request 20 to determine to which of the load-balancing devices 16(0)-16(L) the response 36 should be sent.

Upon receiving the response 36, the load-balancing device 16(0) uses the client request identifier 32 included with the response 36 to correlate the response 36 with the original client request 20, and thereby with the client device 22 that sent the client request 20. The load-balancing device 16(0) then sends the response 36 to the client device 22.

FIGS. 2A-2E illustrate communication flows among elements of the computing system 10 of FIG. 1 for triangulating stateful client requests. Elements of FIG. 1 are referenced in describing FIGS. 2A-2E for the sake of clarity. As seen in FIGS. 2A-2E, each of the client device 22, the load-balancing device 16(0), the unaffiliated processor-based node 14(1), and the secondary session node 14(N) are represented by vertical lines, with communications between these elements illustrated by captioned arrows, and operations performed by each element illustrated by captioned boxes.

Figure 2A:
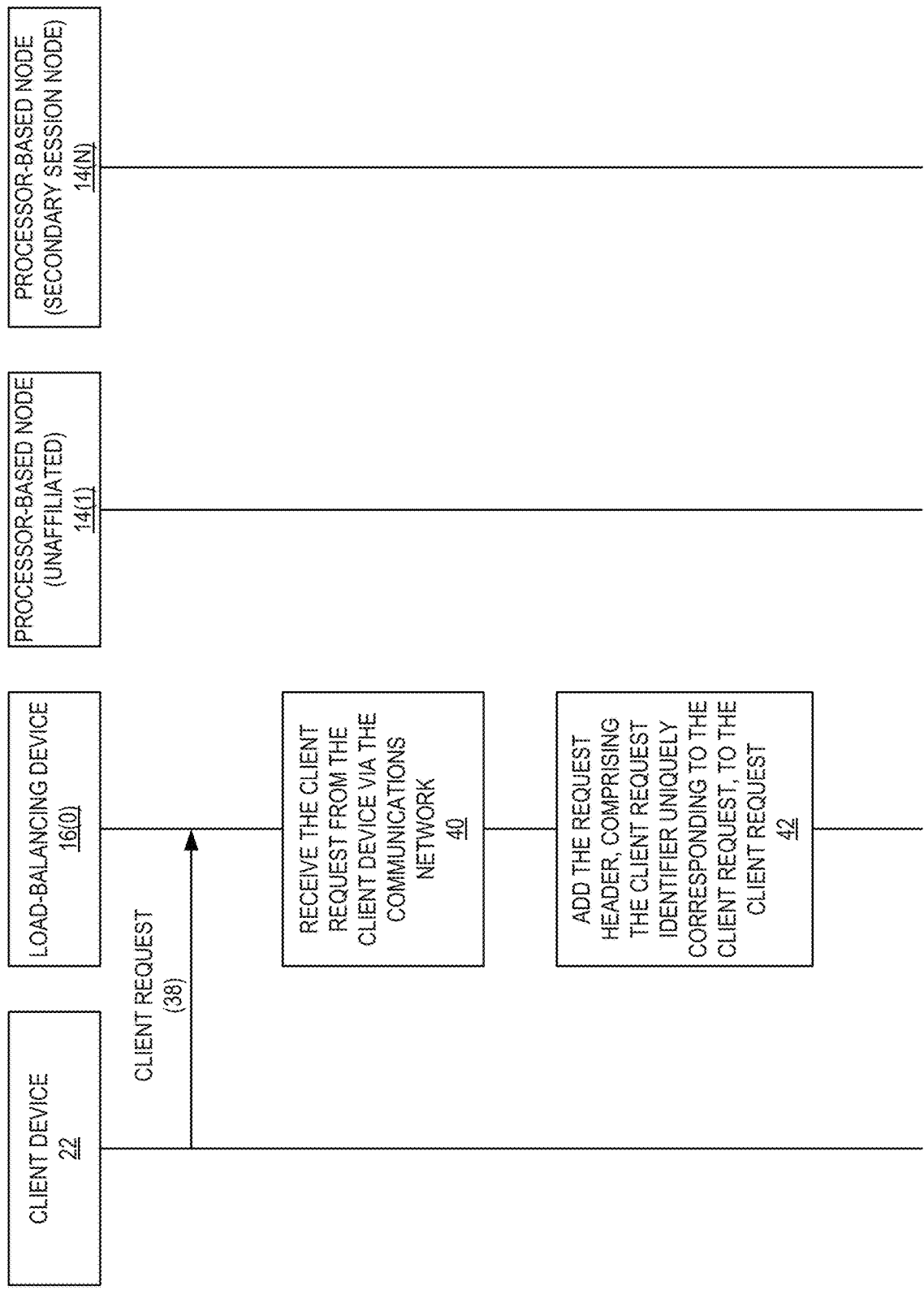
FIGS. 2A-2E are messaging diagrams illustrating communication flows among elements of the computing system of FIG. 1 for triangulating stateful client requests, according to one example.

In the example of FIG. 2A, operations begin with the client device 22 sending the client request 20 to the load-balancing device 16(0) (e.g., by accessing a web application provided by the computing system 10), as indicated by arrow 38. The load-balancing device 16(0) receives the client request 20 from the client device 22 via the communications network 18, as indicated by block 40. The load-balancing device 16(0) next adds the request header 30, comprising the client request identifier 32 uniquely corresponding to the client request 20, to the client request 20, as indicated by block 42. Processing then continues in FIG. 2B.

Figure 2B:
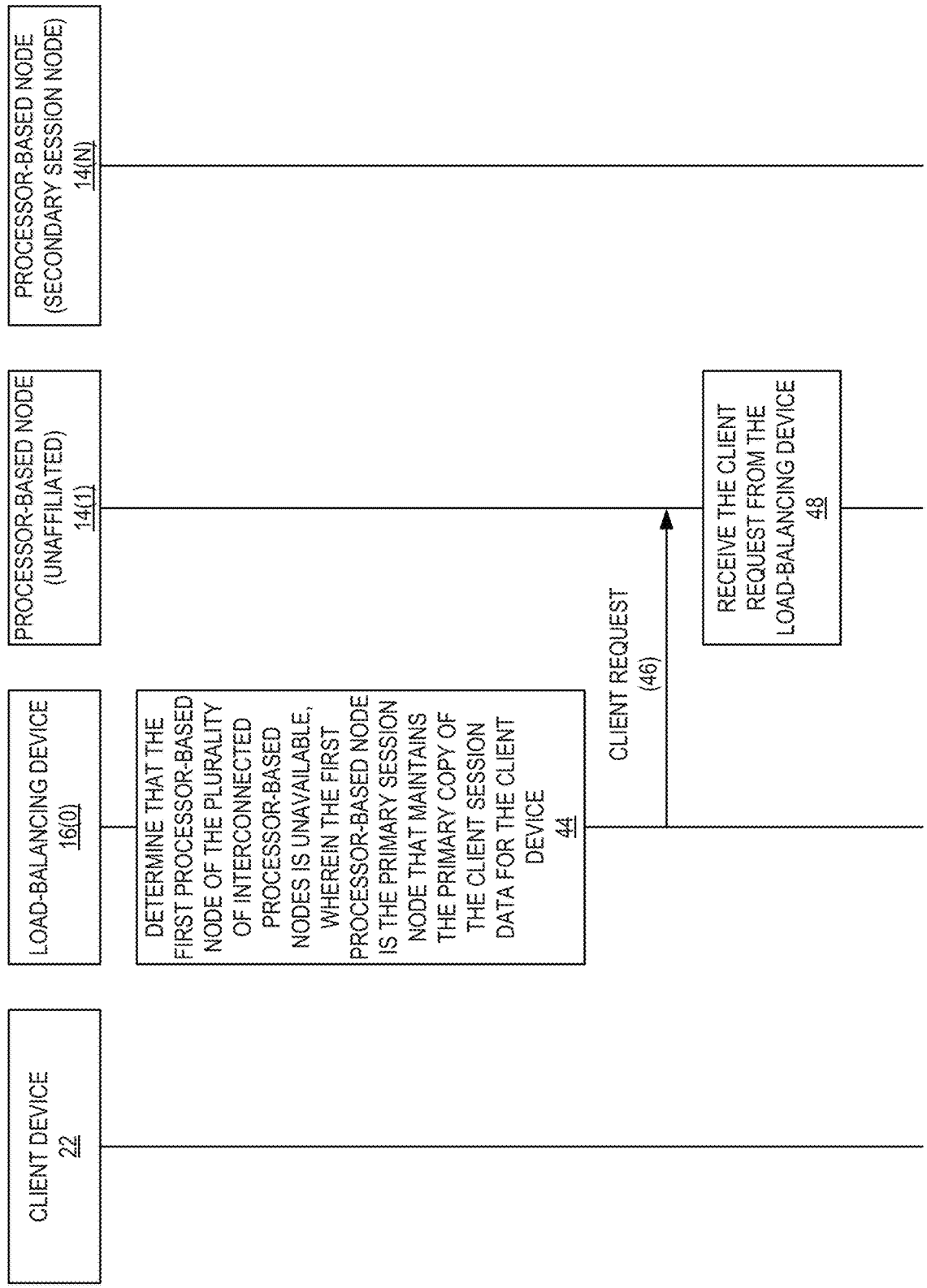

Referring now to FIG. 2B, the load-balancing device 16(0) determines that a first processor-based node (i.e., the processor-based node 14(0) of FIG. 1) of the plurality of interconnected processor-based nodes 14(0)-14(N) is unavailable, wherein the first processor-based node 14(0) is a primary session node that maintains a primary copy of the client session data 26 for the client device 22, as indicated by block 44. In response, the load-balancing device 16(0) then sends the client request 20 to a second processor-based node (i.e., the unaffiliated processor-based node 14(1) of FIG. 1), as indicated by arrow 46. The second processor-based node 14(1) then receives the client request 20 from the load-balancing device 16(0), as indicated by block 48. Processing then resumes in FIG. 2C.

Figure 2C:
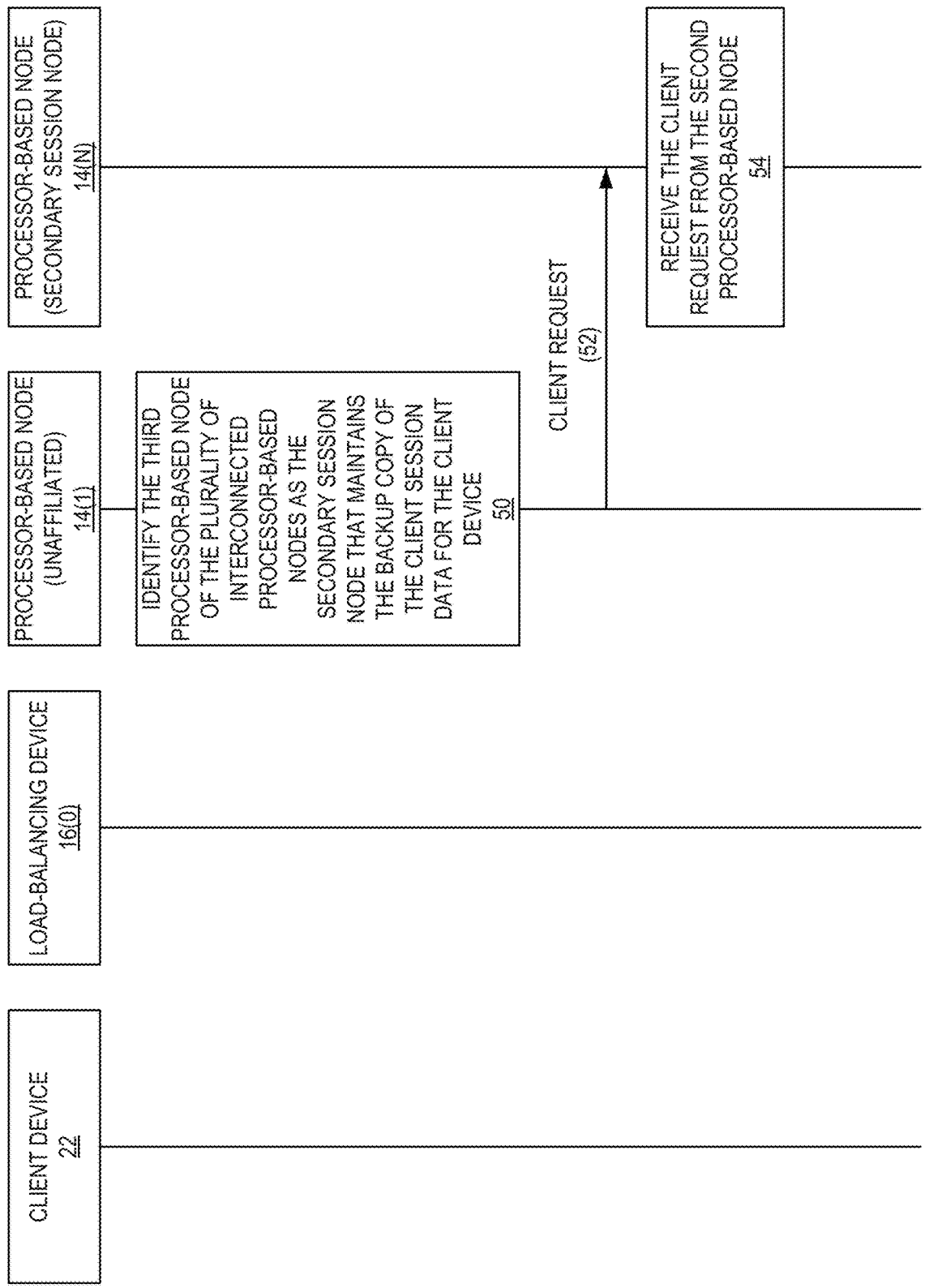

Turning to FIG. 2C, the second processor-based node 14(1) identifies a third processor-based node (i.e., the processor-based node 14(N) of FIG. 1) of the plurality of interconnected processor-based nodes 14(0)-14(N) as a secondary session node that maintains a backup copy of the client session data 28 for the client device 22, as indicated by block 50. The second processor-based node 14(1) sends the client request 20 to the third processor-based node 14(N), as indicated by arrow 52. The third processor-based node 14(N) then receives the client request 20 from the second processor-based node 14(1), as indicated by block 54. Processing then continues in FIG. 2D.

Figure 2D:
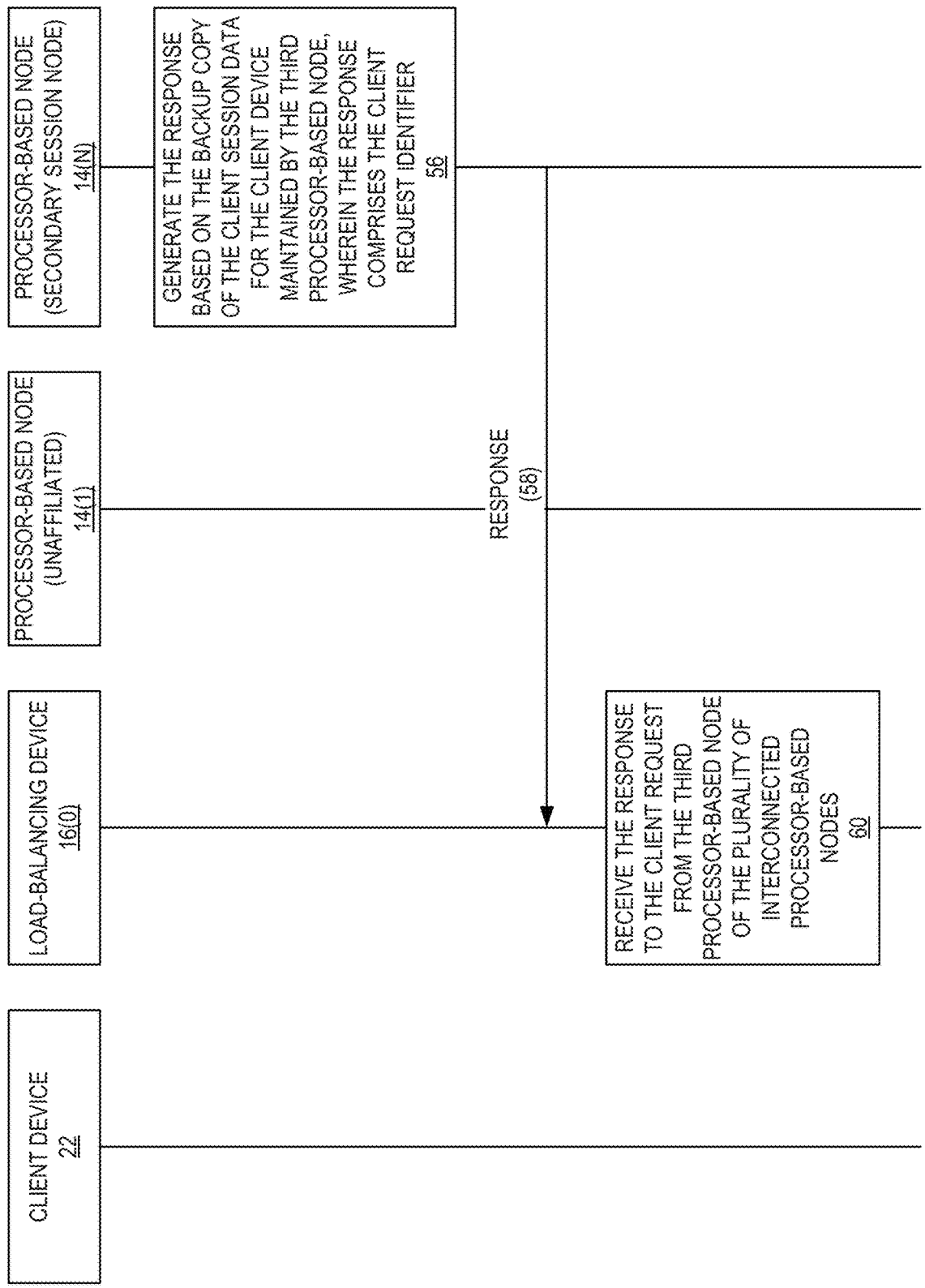

Referring now to FIG. 2D, the third processor-based node 14(N) generates a response 36 based on the backup copy of the client session data 28 for the client device 22 maintained by the third processor-based node 14(N), wherein the response 36 comprises the client request identifier 32, as indicated by block 56. The third processor-based node 14(N) sends the response 36 to the load-balancing device 16(0), as indicated by arrow 58. The load-balancing device 16(0) receives the response 36 to the client request 20 from the third processor-based node 14(N) of the plurality of interconnected processor-based nodes 14(0)-14(N), as indicated by block 60. Processing then resumes in FIG. 2E.

Figure 2E:
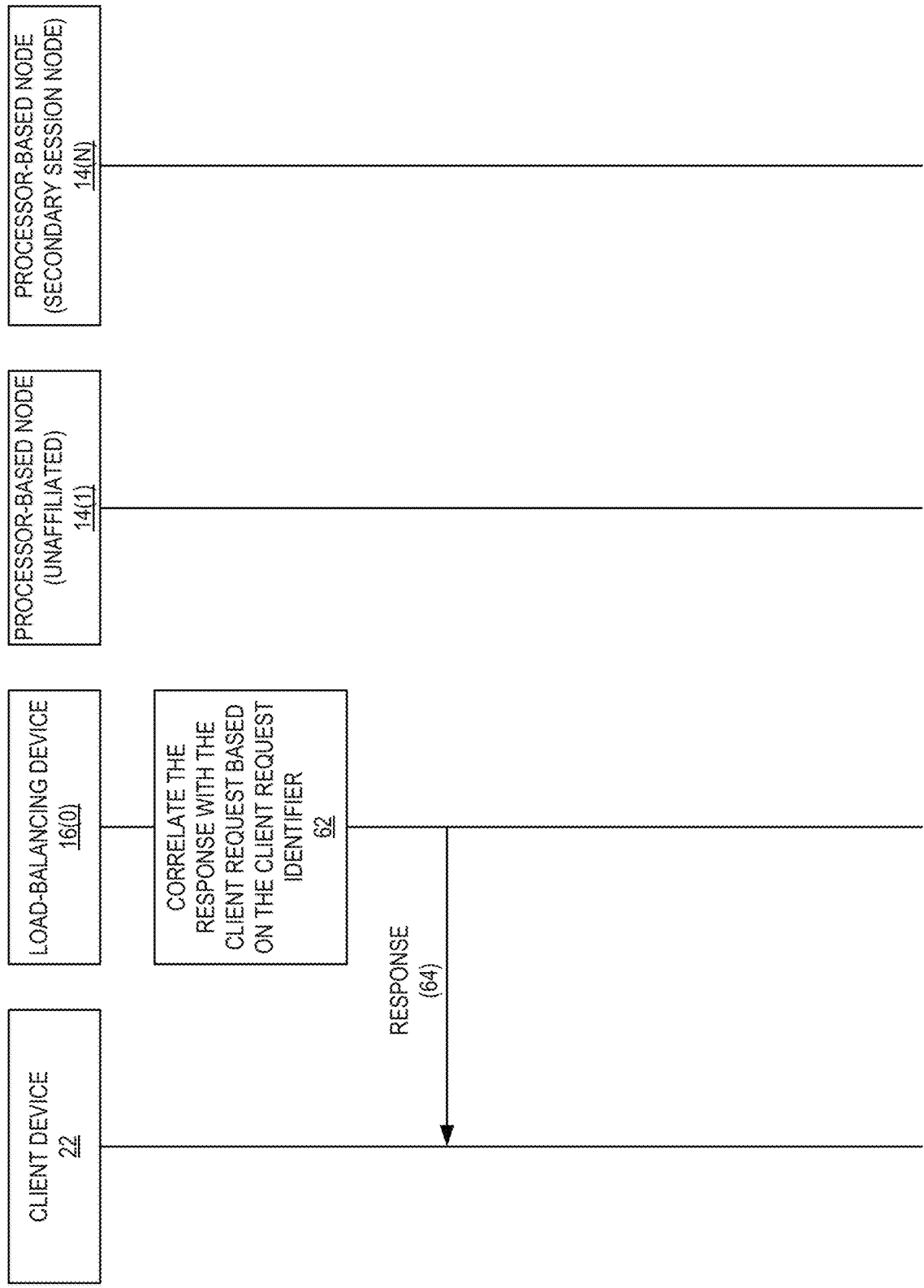

Finally, as seen in FIG. 2E, the load-balancing device 16(0) correlates the response 36 with the client request 20 based on the client request identifier 32, as indicated by block 62. The load-balancing device 16(0) then sends the response 36 to the client device 22, as indicated by arrow 64.

Figure 3A:
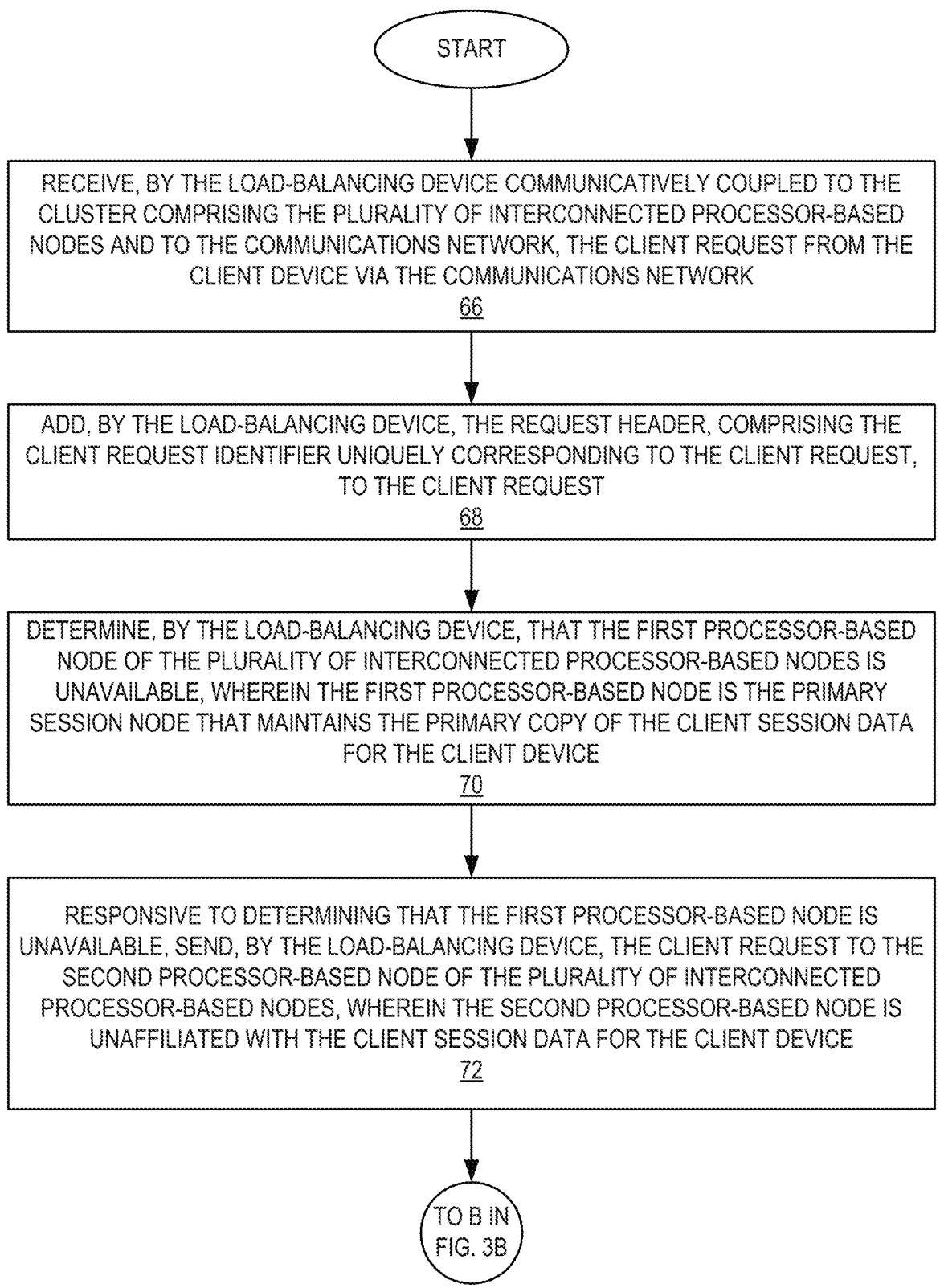
FIGS. 3A-3C are flowcharts illustrating operations performed by the computing system of FIG. 1 for triangulating stateful client requests, according to one example.
Figure 3B:
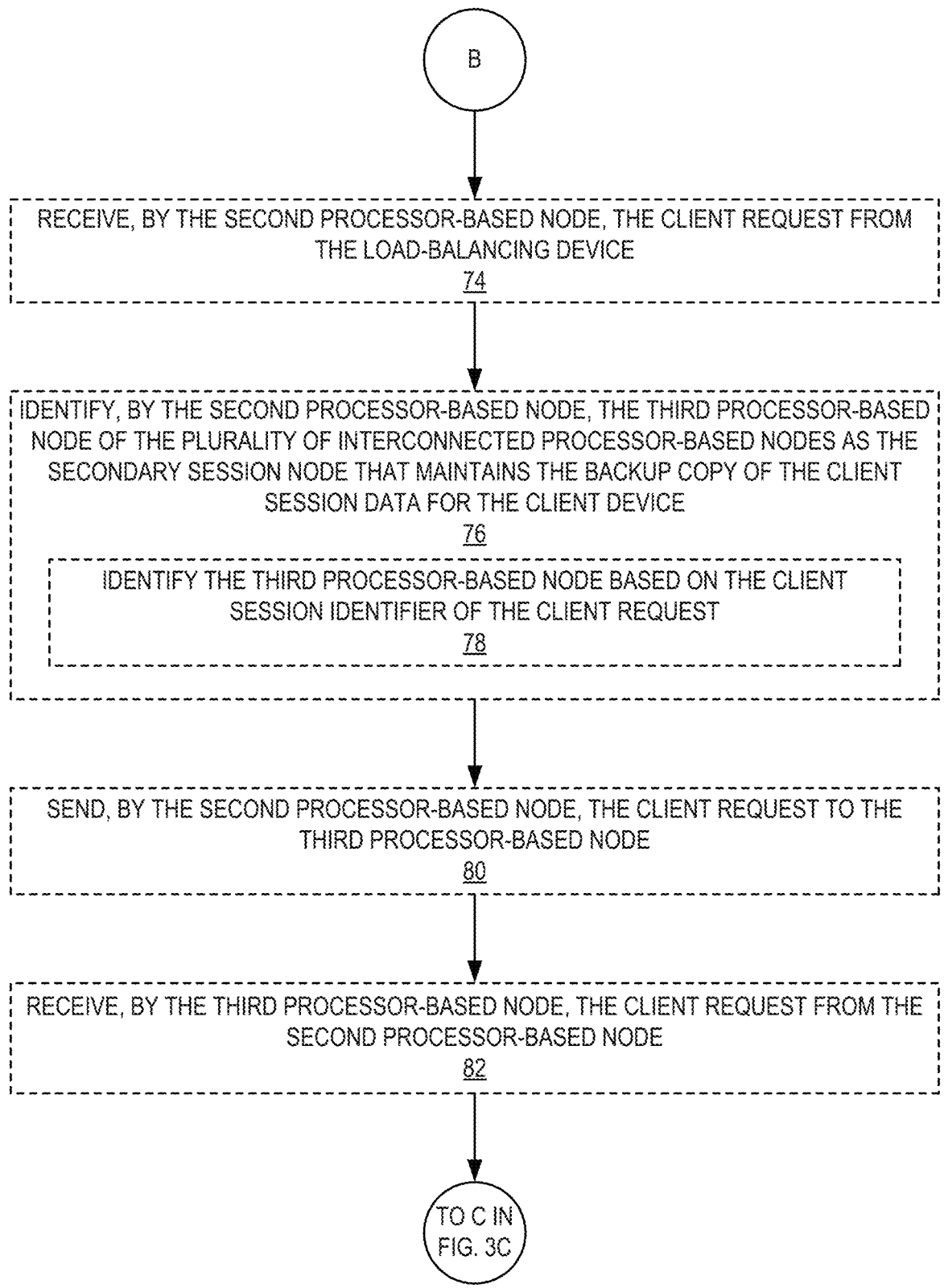
Figure 3C:
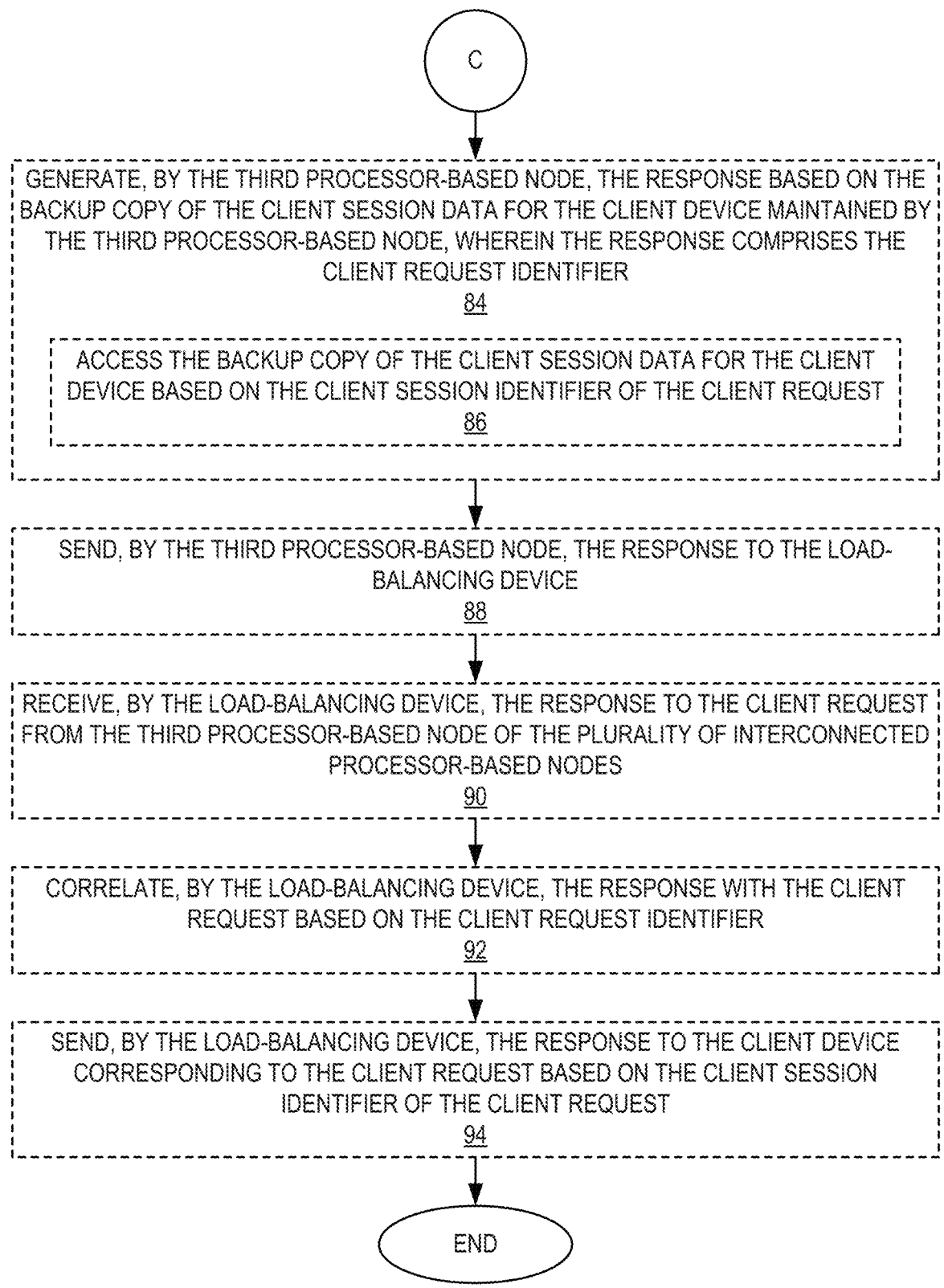

To illustrate operations for triangulating stateful client requests according to one example, FIGS. 3A-3C are provided. For the sake of clarity, elements of FIG. 1 are referenced in describing FIGS. 3A-3C. Operations in FIG. 3A begin with the load-balancing device 16(0) communicatively coupled to the cluster 12 comprising the plurality of interconnected processor-based nodes 14(0)-14(N) and to the communications network 18, receiving the client request 20 from the client device 22 via the communications network 18 (block 66). The load-balancing device 16(0) adds the request header 30, comprising the client request identifier 32 uniquely corresponding to the client request 20, to the client request 20 (block 68).

The load-balancing device 16(0) then determines that a first processor-based node, such as the processor-based node 14(0), of the plurality of interconnected processor-based nodes 14(0)-14(N) is unavailable, wherein the first processor-based node 14(0) is a primary session node that maintains a primary copy of the client session data 26 for the client device 22 (block 70). Responsive to determining that the first processor-based node 14(0) is unavailable, the load-balancing device 16(0) sends the client request 20 to a second processor-based node, such as the processor-based node 14(1), of the plurality of interconnected processor-based nodes 14(0)-14(N), wherein the second processor-based node 14(1) is unaffiliated with the client session data for the client device 22 (block 72). In some examples, processing continues at block 74 of FIG. 3B.

Referring now to FIG. 3B, in some examples, the second processor-based node 14(1) receives the client request 20 from the load-balancing device 16(0) (block 74). The second processor-based node 14(1) identifies a third processor-based node, such as the processor-based node 14(N), of the plurality of interconnected processor-based nodes 14(0)-14(N) as a secondary session node that maintains a backup copy of the client session data 28 for the client device 22 (block 76). According to some examples, the operations of block 76 for identifying the third processor-based node 14(N) may be based on the client session identifier 24 of the client request 20 (block 78). The second processor-based node 14(1) then sends the client request 20 to the third processor-based node 14(N) (block 80). The third processor-based node 14(N) receives the client request 20 from the second processor-based node 14(1) (block 82). Processing then continues at block 84 of FIG. 3C.

Turning now to FIG. 3C, the third processor-based node 14(N) generates the response 36 based on the backup copy of the client session data 28 for the client device 22 maintained by the third processor-based node 14(N), wherein the response 36 comprises the client request identifier 32 (block 84). In some examples, the operations of block 84 for generating the response 36 may include the third processor-based node 14(N) accessing the backup copy of client session data 28 for the client device 22 based on the client session identifier 24 of the client request 20 (block 86). The third processor-based node 14(N) next sends the response 36 to the load-balancing device 16(0) (block 88). In aspects in which the load-balancing device 16(0) is one of a plurality of load-balancing devices 16(0)-16(L), the operations of block 86 for sending the response 36 to the load-balancing device 16(0) may be based on the load-balancing device identifier 34 of FIG. 1.

The load-balancing device 16(0) then receives the response 36 to the client request 20 from the third processor-based node 14(N) of the plurality of interconnected processor-based nodes 14(0)-14(N) (block 90). The load-balancing device 16(0) correlates the response 36 with the client request 20 based on the client request identifier 32 (block 92). Finally, the load-balancing device 16(0) sends the response 36 to the client device 22 corresponding to the client request 20 based on the client session identifier 24 of the client request 20 (block 94).

Figure 4:
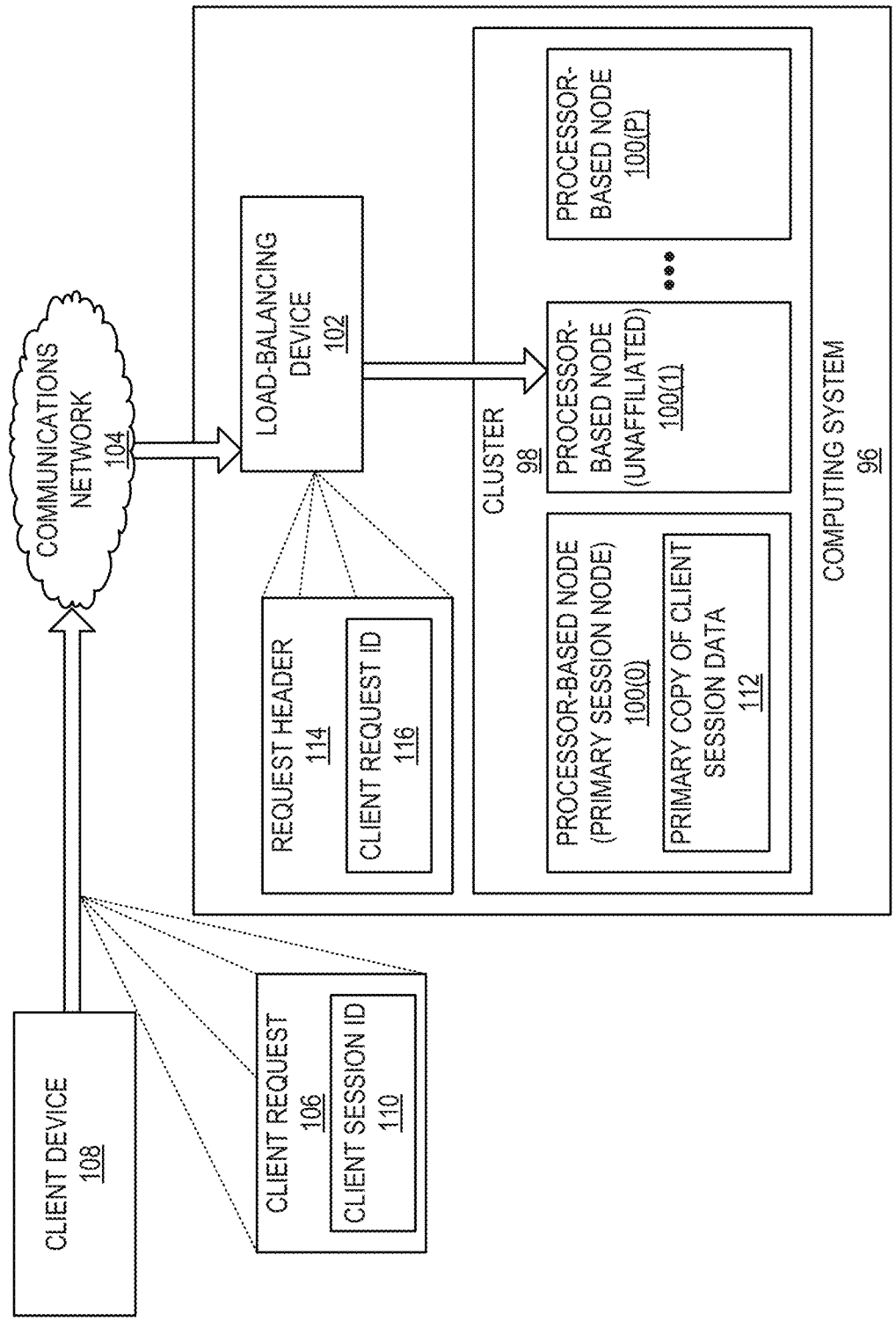
FIG. 4 is a simpler block diagram of the computing system of FIG. 1 for providing a load-balancing device that generates a request header comprising a client request identifier, according to one example.

FIG. 4 is a simpler block diagram of the computing system of FIG. 1 for providing a load-balancing device that generates a request header comprising a client request identifier, according to one example. In FIG. 4, a computing system 96 includes a cluster 98 that comprises a plurality of interconnected processor-based nodes 100(0)-100(P). The processor-based nodes 100(0)-100(P) are communicatively coupled to a load-balancing device 102, which in turn is communicatively coupled to a communications network 104. In the example of FIG. 4, the load-balancing device 102 receives a client request 106 from a client device 108 via the communications network 104. The client request 106 is a stateful client request, and thus includes a client session identifier ("CLIENT SESSION ID") 110 that uniquely corresponds to an ongoing client session of the client device 108, and that the computing system 96 can use to associate the client request 106 with the ongoing client session. As seen in FIG. 4, the processor-based node 100(0) has been designated as the primary session node for the client request 106, and as a result stores a primary copy of client session data 112 for the client request 106.

Upon receiving the client request 106, the load-balancing device 102 adds a request header 114 to the client request 106. The request header 114 includes a client request identifier ("CLIENT REQUEST ID") 116 that uniquely corresponds to the client request 106. The load-balancing device 102 then determines that the processor-based node 100(0) serving as the primary session node is unavailable. In response, the load-balancing device 102 sends the client request 106, including the added request header 114, to the processor-based node 100(1), which is unaffiliated with the client session data for the client device 108.

Figure 5:
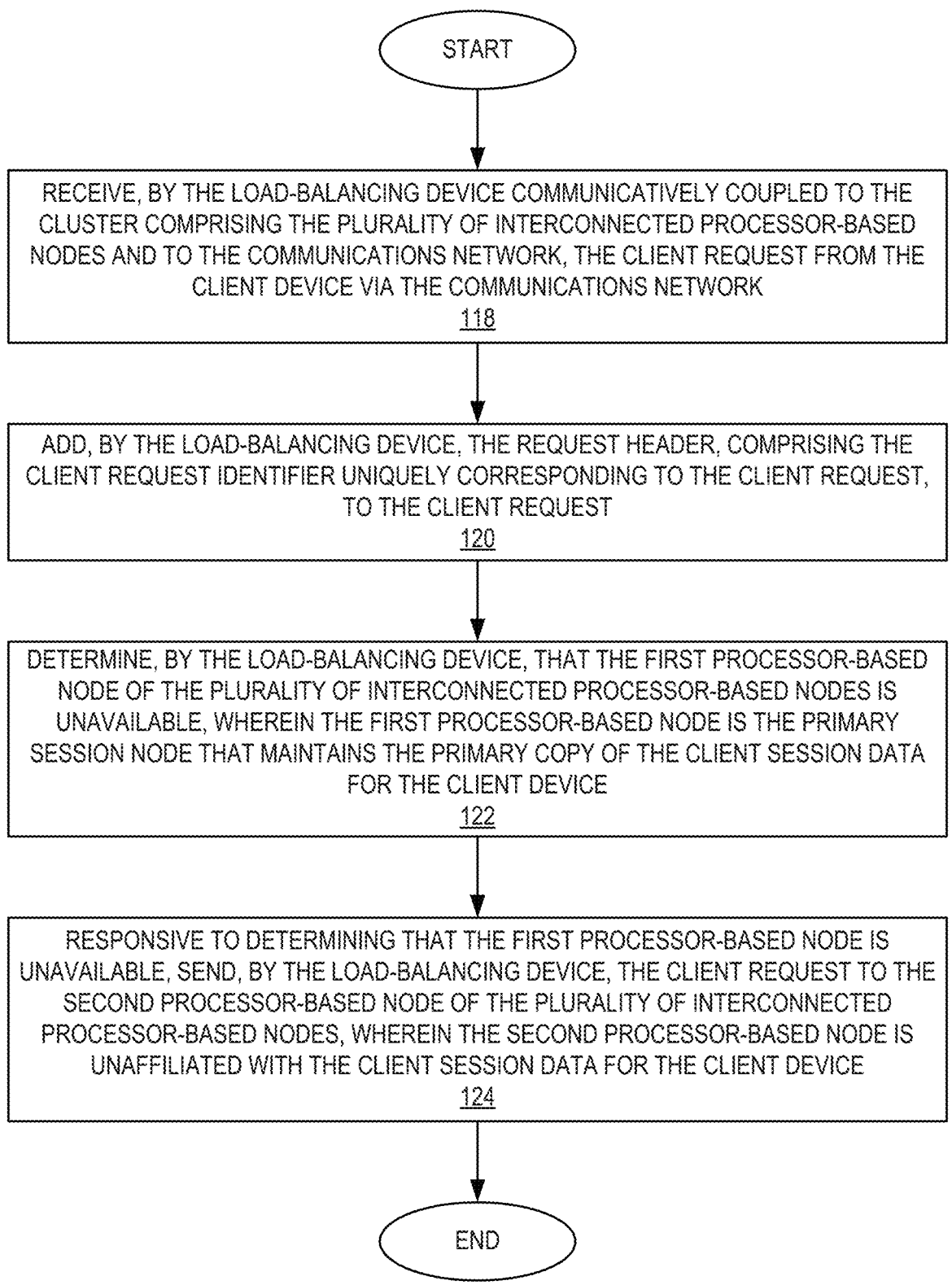
FIG. 5 is a flowchart of a simplified method for receiving a client request and generating a request header comprising a client request identifier by the load-balancing device of FIG. 4, according to one example.

To illustrate a simplified method for receiving a client request and generating a request header comprising a client request identifier according to one example, FIG. 5 is provided. Elements of FIG. 4 are referenced in describing FIG. 5, for the sake of clarity. Operations in FIG. 5 begin with a load-balancing device (e.g., the load-balancing device 102 of FIG. 1), communicatively coupled to the cluster 98 comprising the plurality of interconnected processor-based nodes 100(0)-100(N) and to the communications network 104, receiving the client request 106 from the client device 108 via the communications network 104 (block 118). The load-balancing device 102 adds the request header 114, comprising the client request identifier 116 uniquely corresponding to the client request 106, to the client request 106 (block 120).

The load-balancing device 102 then determines that a first processor-based node, such as the processor-based node 100(0), of the plurality of interconnected processor-based nodes 100(0)-100(N) is unavailable, wherein the first processor-based node 100(0) is a primary session node that maintains a primary copy of the client session data 112 for the client device 108 (block 122). Responsive to determining that the first processor-based node 100(0) is unavailable, the load-balancing device 102 sends the client request 106 to a second processor-based node, such as the processor-based node 100(1), of the plurality of interconnected processor-based nodes 100(0)-100(N), wherein the second processor-based node 100(1) is unaffiliated with the client session data for the client device 108 (block 124).

Figure 6:
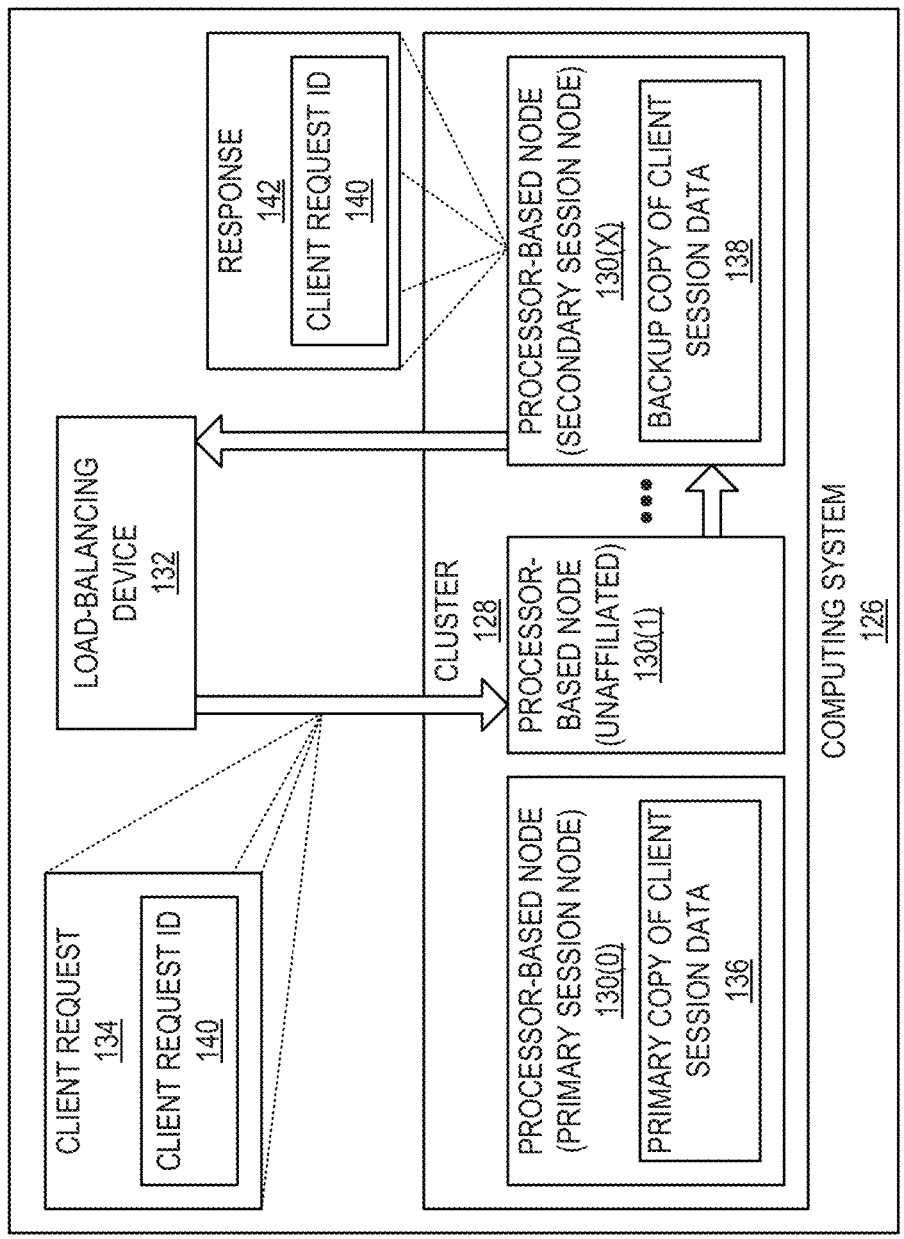
FIG. 6 is a simpler block diagram of the computing system of FIG. 1 for providing processor-based nodes for redirecting client requests and generating a response, according to one example.

FIG. 6 is a simpler block diagram of the computing system of FIG. 6 for providing processor-based nodes for redirecting client requests and generating a response, according to one example. As seen in FIG. 6, a computing system 126 in which examples may be practiced includes a cluster 128 that comprises a plurality of interconnected processor-based nodes 130(0)-130(X). The processor-based nodes 130(0)-130(X) are communicatively coupled to a load-balancing device 132. As seen in FIG. 6, the processor-based node 130(0) has been designated as the primary session node for a client request 134, and as a result stores a primary copy of client session data 136 for the client request 134. Likewise, the processor-based node 130(X) has been designated as the secondary session node for the client request 134, and thus stores a backup copy of the client session data 138 for the client request 134.

In the example of FIG. 6, the processor-based node 130(1) receives the client request 134, to which a client request identifier ("CLIENT REQUEST ID") 140 that uniquely corresponds to the client request 134 has been added, from the load-balancing device 132. The processor-based node 130(1) determines that it does not maintain a copy of client session data corresponding to the client request (i.e., the processor-based node 130(1) is "unaffiliated"). Accordingly, the processor-based node 130(1) identifies a secondary session node (i.e., the processor-based node 130(X) of FIG. 6) among the plurality of interconnected processor-based nodes 130(0)-130(X) of the cluster 128. The processor-based node 130(1) then sends the client request 134 to the processor-based node 130(X) for handling.

The processor-based node 130(X), upon receiving the client request 134 from the processor-based node 130(1), determines that it maintains the backup copy of the client session data 138 corresponding to the client request. The processor-based node 130(X) thus uses the backup copy of the client session data 138 to generate a response 142 to the client request 134. The response 142 generated by the processor-based node 130(X) includes the client request identifier 140 added to the client request 134 by the load-balancing device 132. The processor-based node 130(X) then sends the response 142 to the load-balancing device 132.

Figure 7:
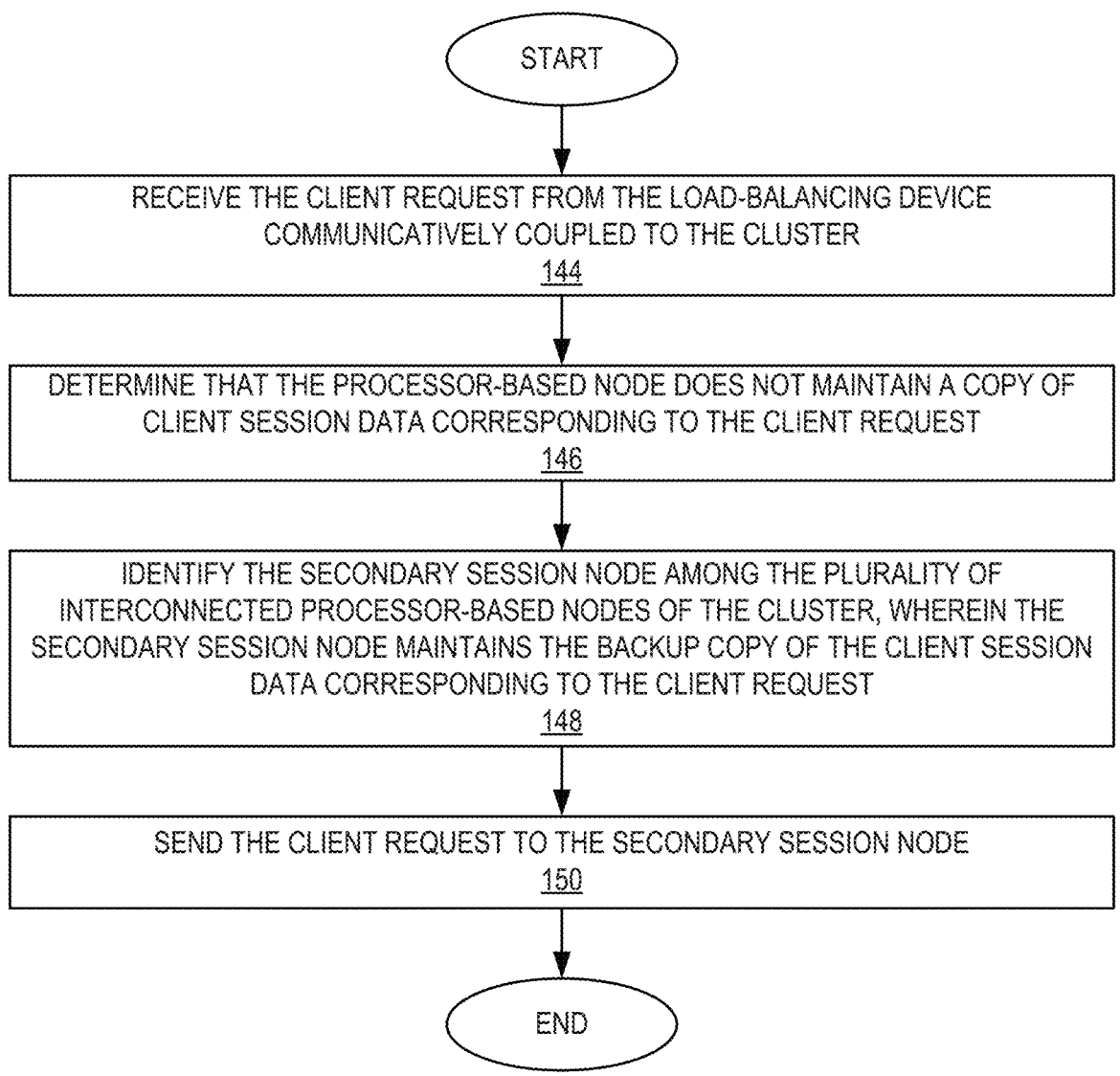
FIG. 7 is a flowchart of a simplified method for receiving a client request by a processor-based node of FIG. 6, and forwarding the client request to a secondary session node, according to one example.

FIG. 7 is a flowchart of operations performed by an unaffiliated processor-based node, such as the processor-based node 130(1) of FIG. 6, for receiving a client request and forwarding the client request to a secondary session node, according to one example. Elements of FIG. 6 are referenced in describing FIG. 7 for the sake of clarity. In FIG. 7, operations begin with the processor-based node 130(1) receiving the client request 134 from the load-balancing device 132 communicatively coupled to the cluster 128 (block 144). The processor-based node 130(1) determines that the processor-based node 130(1) does not maintain a copy of client session data corresponding to the client request 134 (block 146). Accordingly, the processor-based node 130(1) identifies the secondary session node (i.e., the processor-based node 130(X) of FIG. 6) among the plurality of interconnected processor-based nodes 130(0)-130(X) of the cluster 128, wherein the secondary session node 130(X) maintains the backup copy of the client session data 138 corresponding to the client request 134 (block 148). The processor-based node 130(1) then sends the client request 134 to the secondary session node 130(X) (block 150).

Figure 8:
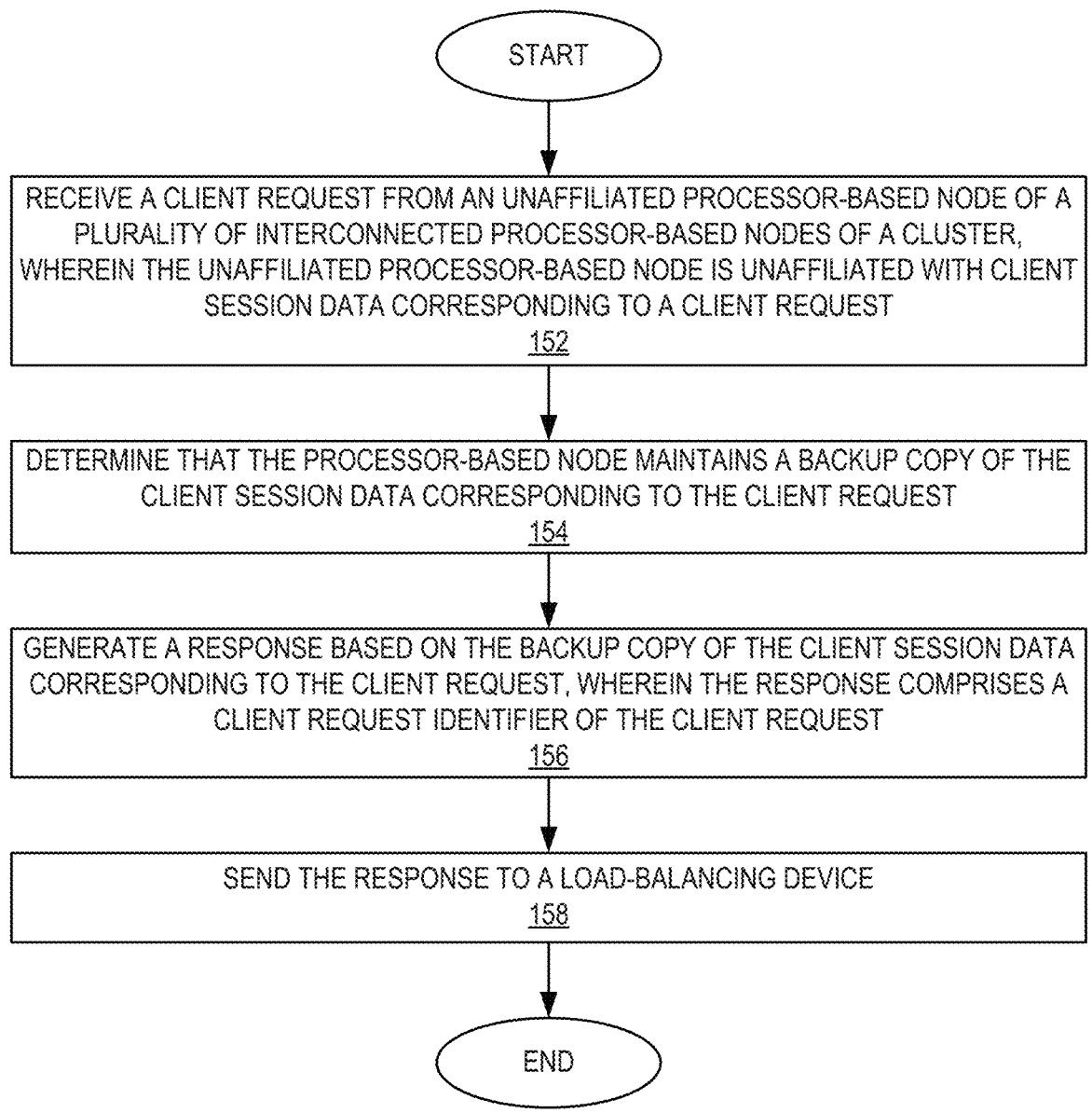
FIG. 8 is a flowchart of a simplified method for receiving a redirected client request and generating a response by the processor-based nodes of FIG. 6, according to one example.

FIG. 8 is a flowchart of operations performed by a secondary session node, such as the processor-based node 130(X) of FIG. 6, for receiving a redirected client request and generating a response, according to one example. For the sake of clarity, elements of FIG. 6 are referenced in describing FIG. 8. Operations in FIG. 8 begin with the processor-based node 130(X) receiving the client request 134 from the unaffiliated processor-based node (i.e., the processor-based node 130(1) of FIG. 6) of the plurality of interconnected processor-based nodes 130(0)-130(X) of the cluster 128, wherein the unaffiliated processor-based node 130(1) is unaffiliated with client session data corresponding to the client request 134 (block 152). The processor-based node 130(X) determines that the processor-based node 130(X) maintains the backup copy of the client session data 138 corresponding to the client request 134 (block 154). Accordingly, the processor-based node 130(X) generates the response 142 based on the backup copy of the client session data 138 corresponding to the client request 134, wherein the response 142 comprises the client request identifier 140 of the client request 134 (block 156). The processor-based node 130(X) then sends the response 142 to the load-balancing device 132 (block 158).

Figure 9A:
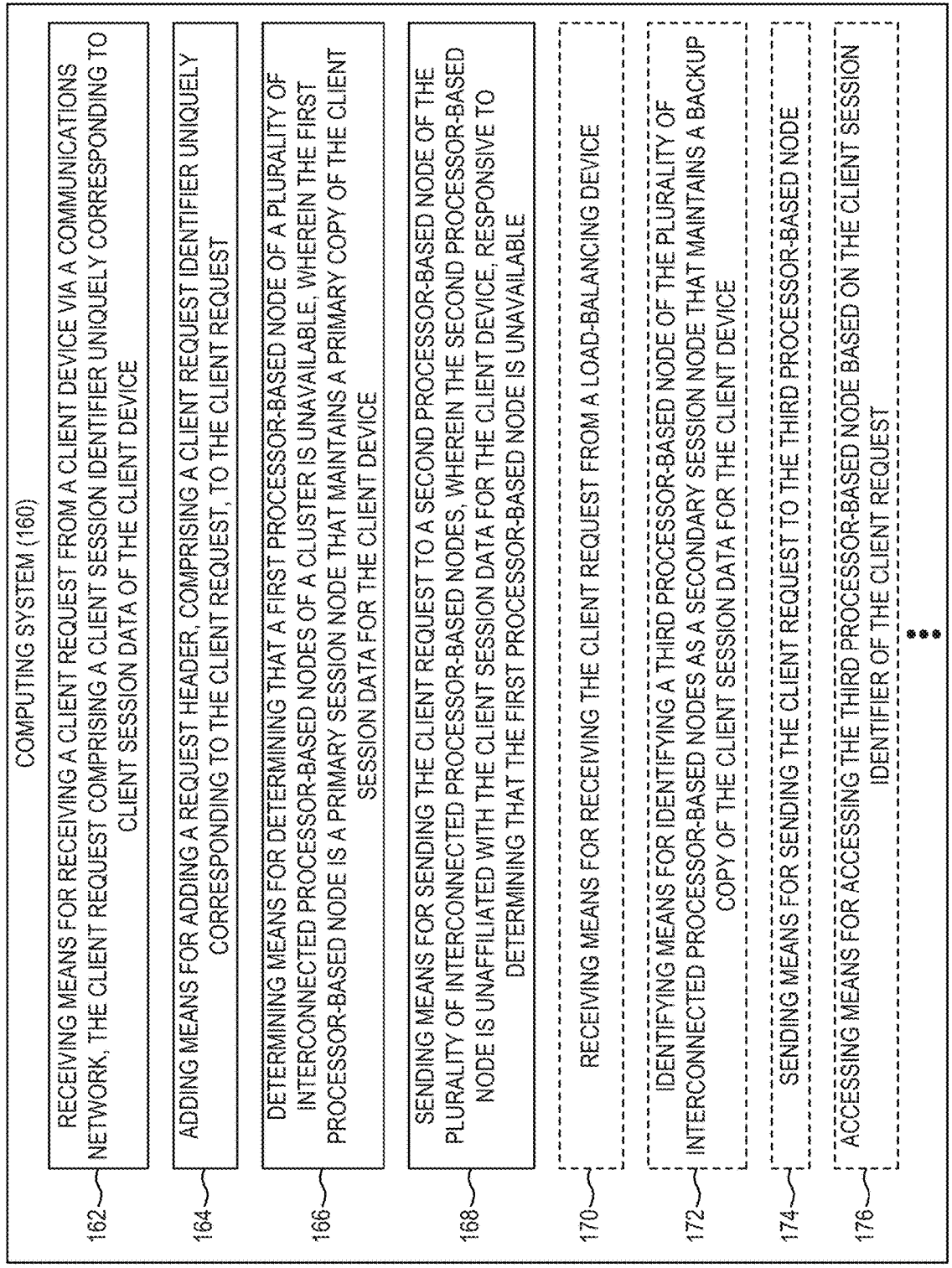
FIGS. 9A and 9B are block diagrams of a computing system providing means suitable for implementing examples, according to one example.
Figure 9B:
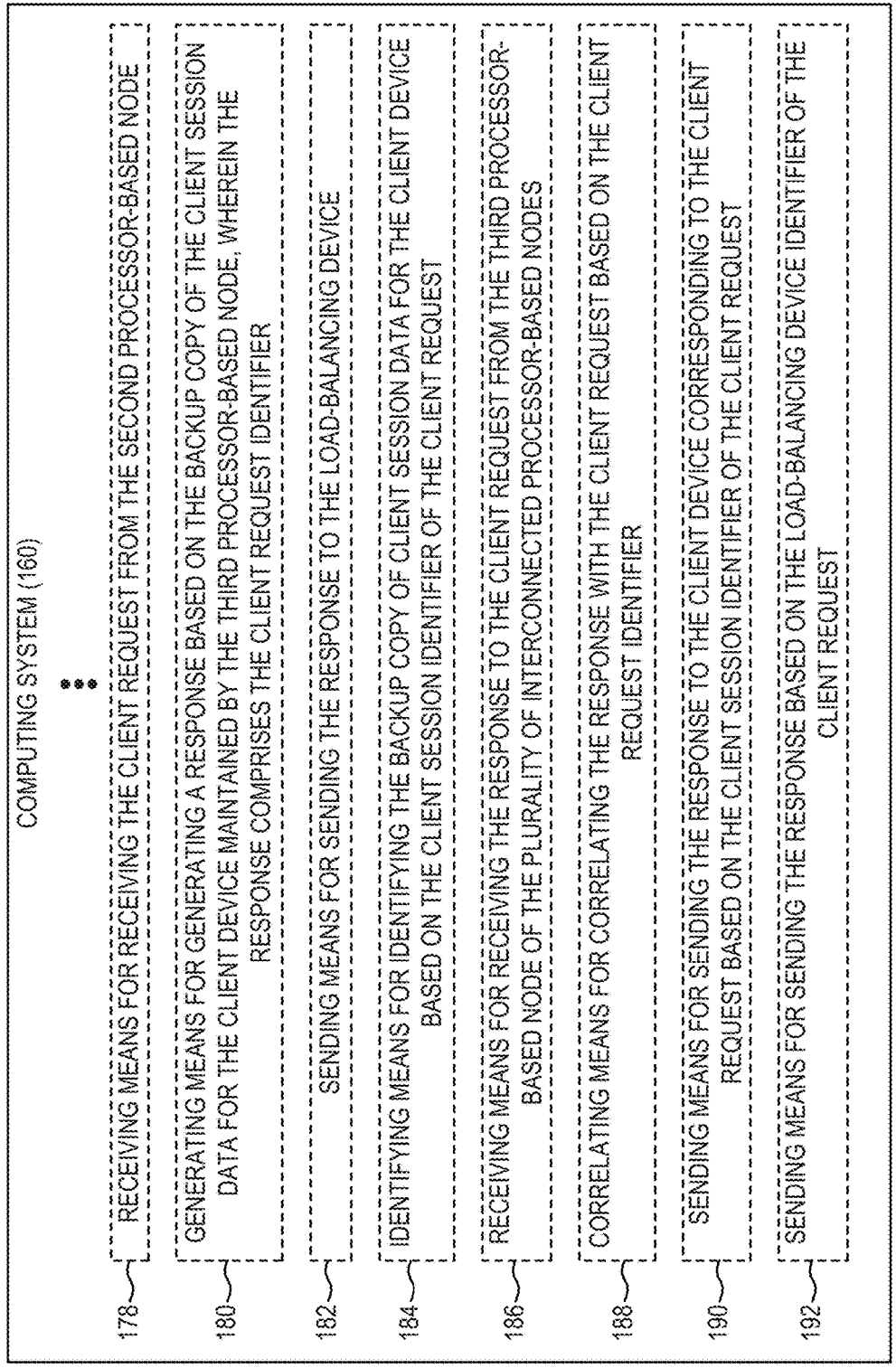

FIGS. 9A and 9B are block diagrams of a computing system providing means suitable for implementing examples. As seen in FIG. 9A, a computing system 160 includes a receiving means 162 for receiving a client request from a client device via a communications network, the client request comprising a client session identifier uniquely corresponding to client session data of the client device. The computing system 160 further includes an adding means 164 for adding a request header, comprising a client request identifier uniquely corresponding to the client request, to the client request. The computing system 160 also includes a determining means 166 for determining that a first processor-based node of a plurality of interconnected processor-based nodes of a cluster is unavailable, wherein the first processor-based node is a primary session node that maintains a primary copy of client session data for the client device.

The computing system 160 additionally includes a sending means 168 for sending the client request to a second processor-based node of the plurality of interconnected processor-based nodes, wherein the second processor-based node is unaffiliated with the client session data for the client device, responsive to determining that the first processor-based node is unavailable. The computing system 160 further includes a receiving means 170 for receiving the client request from a load-balancing device. The computing system 160 also includes an identifying means 172 for identifying a third processor-based node of the plurality of interconnected processor-based nodes as a secondary session node that maintains a backup copy of the client session data for the client device. The computing system 160 additionally includes a sending means 174 for sending the client request to the third processor-based node. The computing system 160 further includes an accessing means 176 for accessing the third processor-based node based on the client session identifier of the client request.

Turning now to FIG. 9B, the computing system 160 also includes a receiving means 178 for receiving the client request from the second processor-based node. The computing system 160 additionally includes a generating means 180 for generating a response based on the backup copy of the client session data for the client device maintained by the third processor-based node, wherein the response comprises the client request identifier. The computing system 160 further includes a sending means 182 for sending the response to the load-balancing device. The computing system 160 also includes an identifying means 184 for identifying the backup copy of client session data for the client device based on the client session identifier of the client request.

The computing system 160 additionally includes a receiving means 186 for receiving the response to the client request from the third processor-based node of the plurality of interconnected processor-based nodes. The computing system 160 further includes a correlating means 188 for correlating the response with the client request based on the client request identifier. The computing system 160 also includes a sending means 190 for sending the response to the client device corresponding to the client request based on the client session identifier of the client request. The computing system 160 additionally includes a sending means 192 for sending the response based on the load-balancing device identifier of the client request.

Figure 10A:
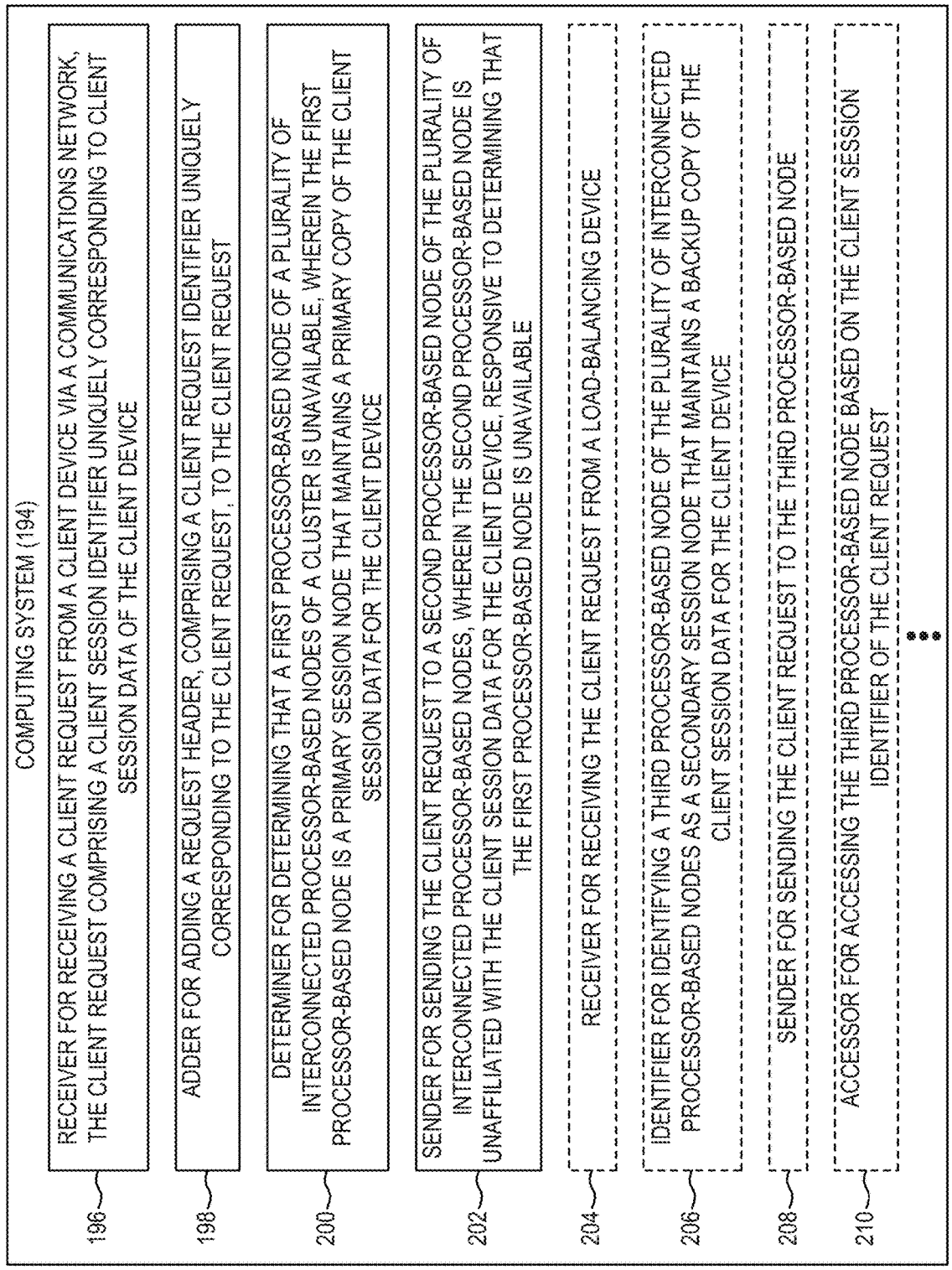
FIGS. 10A and 10B are block diagrams of a computing system suitable for implementing examples, according to another example.
Figure 10B:
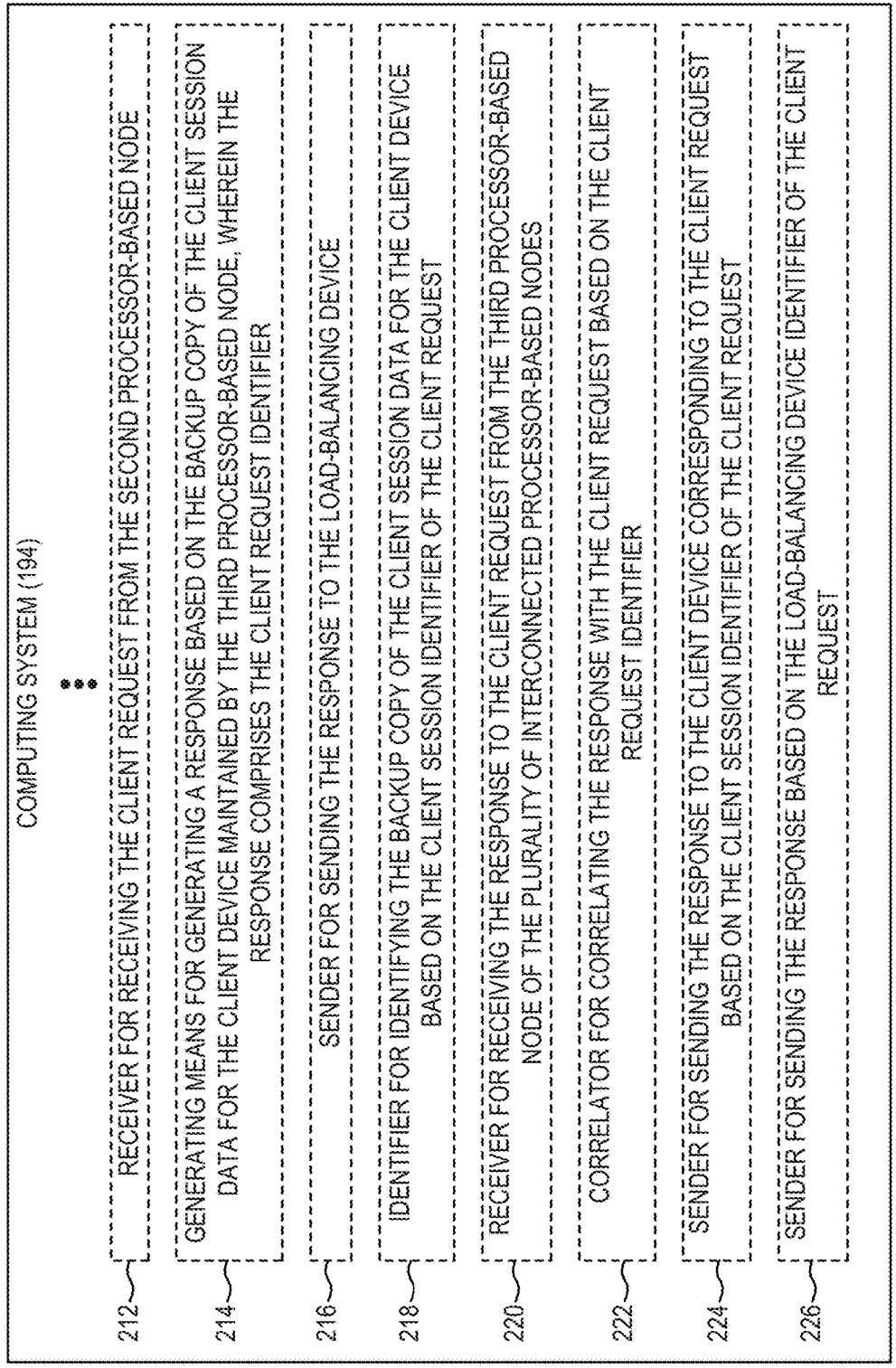

FIGS. 10A and 10B are block diagrams of a computing system suitable for implementing examples, according to another example. As shown in FIG. 10A, a computing system 194 includes a receiver 196 for receiving a client request from a client device via a communications network, the client request comprising a client session identifier uniquely corresponding to client session data of the client device. The computing system 194 further includes an adder 198 for adding a request header, comprising a client request identifier uniquely corresponding to the client request, to the client request. The computing system 194 also includes a determiner 200 for determining that a first processor-based node of a plurality of interconnected processor-based nodes of a cluster is unavailable, wherein the first processor-based node is a primary session node that maintains a primary copy of client session data for the client device.

The computing system 194 additionally includes a sender 202 for sending, by the load-balancing device, the client request to a second processor-based node of the plurality of interconnected processor-based nodes, wherein the second processor-based node is unaffiliated with the client session data for the client device, responsive to determining that the first processor-based node is unavailable. The computing system 194 further includes a receiver 204 for receiving the client request from the load-balancing device. The computing system 194 also includes an identifier 206 for identifying a third processor-based node of the plurality of interconnected processor-based nodes as a secondary session node that maintains a backup copy of the client session data for the client device. The computing system 194 additionally includes a sender 208 for sending the client request to the third processor-based node. The computing system 194 further includes an accessor 210 for accessing the third processor-based node based on the client session identifier of the client request.

Referring now to FIG. 10B, the computing system 194 also includes a receiver 212 for receiving the client request from the second processor-based node. The computing system 194 additionally includes a generator 214 for generating a response based on the backup copy of the client session data for the client device maintained by the third processor-based node, wherein the response comprises the client request identifier. The computing system 194 further includes a sender 216 for sending the response to the load-balancing device. The computing system 194 also includes an identifier 218 for identifying the backup copy of the client session data for the client device based on the client session identifier of the client request.

The computing system 194 additionally includes a receiver 220 for receiving the response to the client request from the third processor-based node of the plurality of interconnected processor-based nodes. The computing system 194 further includes a correlator 222 for correlating the response with the client request based on the client request identifier. The computing system 194 also includes a sender 224 for sending the response to the client device corresponding to the client request based on the client session identifier of the client request. The computing system 194 additionally includes a sender 226 for sending the response based on the load-balancing device identifier of the client request.

Figure 11:
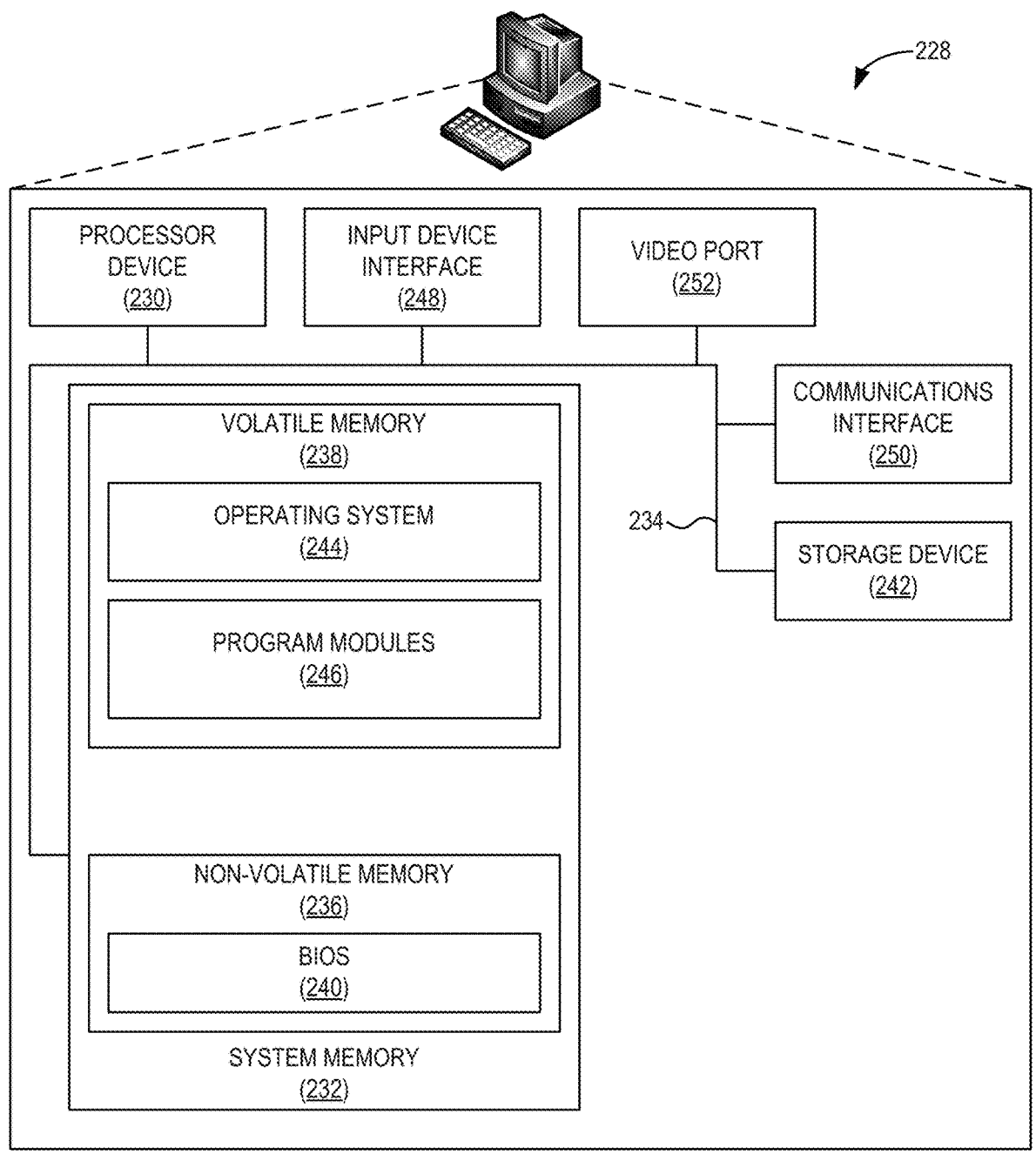
FIG. 11 is a block diagram of a computing device suitable for implementing examples, according to still another example.

FIG. 11 is a block diagram of a processor-based computing device 228 ("computing device 228"), such as the load-balancing device 16(0) and the processor-based nodes 14(0)-14(N) of FIG. 1, suitable for implementing examples, according to one example. The computing device 228 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 228 includes a processor device 230, a system memory 232, and a system bus 234. The system bus 234 provides an interface for system components including, but not limited to, the system memory 232 and the processor device 230. The processor device 230 can be any commercially available or proprietary processor.

The system bus 234 may be any of several types of bus structures that may further interconnect to a memory bus (with or without a memory controller), a peripheral bus, and/or a local bus using any of a variety of commercially available bus architectures. The system memory 232 may include non-volatile memory 236 (e.g., read-only memory (ROM), erasable programmable ROM (EPROM), electrically EPROM (EEPROM), etc.), and volatile memory 238 (e.g., RAM). A basic input/output system (BIOS) 240 may be stored in the non-volatile memory 236 and can include the basic routines that help to transfer information among elements within the computing device 228. The volatile memory 238 may also include a high-speed RAM, such as static RAM, for caching data.

The computing device 228 may further include or be coupled to a non-transitory computer-readable storage medium such as a storage device 242, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 242 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 242 and in the volatile memory 238, including an operating system 244 and one or more program modules 246 which may implement the functionality described herein in whole or in part. It is to be appreciated that the examples can be implemented with various commercially available operating systems 244 or combinations of operating systems 244. All or a portion of the examples may be implemented as a computer program product stored on a transitory or non-transitory computer-usable or computer-readable storage medium, such as the storage device 242, which includes complex programming instructions, such as complex computer-readable program code, to cause the processor device 230 to carry out the steps described herein. Thus, the computer-readable program code can comprise software instructions for implementing the functionality of the examples described herein when executed on the processor device 230. The processor device 230 may serve as a controller, or control system, for the computing device 228 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 230 through an input device interface 248 that is coupled to the system bus 234 but can be connected by other interfaces, such as a parallel port, an Institute of Electrical and Electronic Engineers (IEEE) 1394 serial port, a Universal Serial Bus (USB) port, an IR interface, and the like.

The computing device 228 may also include a communications interface 250 suitable for communicating with a network as appropriate or desired. The computing device 228 may also include a video port 252 to interface with a display device to provide information to a user.

The examples also facilitate an improvement to computer functionality itself via reducing unnecessary data fetches and contention within a computing system, resulting in improved response time and decreased network and processor loads. Thus, the examples are directed to specific improvements in computer functionality.

Other computing system designs and configurations may also be suitable to implement the systems, apparatus, and methods described herein. The following examples illustrate various implementations in accordance with one or more aspects of the present disclosure.

Example 1 is a computing system comprising a load-balancing device configured to be communicatively coupled to a cluster comprising a plurality of interconnected processor-based nodes and to a communications network; the load-balancing device to: receive a client request from a client device via the communications network, the client request comprising a client session identifier uniquely corresponding to client session data of the client device; add a request header, comprising a client request identifier uniquely corresponding to the client request, to the client request; determine that a first processor-based node of the plurality of interconnected processor-based nodes is unavailable, wherein the first processor-based node is a primary session node that maintains a primary copy of client session data for the client device; and responsive to determining that the first processor-based node is unavailable, send the client request to a second processor-based node of the plurality of interconnected processor-based nodes, wherein the second processor-based node is unaffiliated with the client session data for the client device.

Example 2 is the computing system of example 1, further comprising the second processor-based node, the second processor-based node to: receive the client request from the load-balancing device; identify a third processor-based node of the plurality of interconnected processor-based nodes as a secondary session node that maintains a backup copy of the client session data for the client device; and send the client request to the third processor-based node.

Example 3 is the computing system of example 2, wherein to identify the third processor-based node as the secondary session node is to identify the third processor-based node based on the client session identifier of the client request.

Example 4 is the computing system of example 2, further comprising the third processor-based node, the third processor-based node to: receive the client request from the second processor-based node; generate a response based on the backup copy of the client session data for the client device maintained by the third processor-based node, wherein the response comprises the client request identifier; and send the response to the load-balancing device.

Example 5 is the computing system of example 4, wherein to generate the response is to access the backup copy of client session data for the client device based on the client session identifier of the client request.

Example 6 is the computing system of example 4, wherein the load-balancing device is further to: receive the response to the client request from the third processor-based node of the plurality of interconnected processor-based nodes; correlate the response with the client request based on the client request identifier; and send the response to the client device corresponding to the client request based on the client session identifier of the client request.

Example 7 is the computing system of example 6, further comprising a plurality of load-balancing devices including the load-balancing device; wherein: the request header further comprises a load-balancing device identifier uniquely corresponding to the load-balancing device; and the third processor-based node is to send the response to the load-balancing device based on the load-balancing device identifier of the client request.

Example 8 is a method comprising: receiving, by a load-balancing device communicatively coupled to a cluster comprising a plurality of interconnected processor-based nodes and to a communications network, a client request from a client device via the communications network, the client request comprising a client session identifier uniquely corresponding to client session data of the client device; adding, by the load-balancing device, a request header, comprising a client request identifier uniquely corresponding to the client request, to the client request; determining, by the load-balancing device, that a first processor-based node of the plurality of interconnected processor-based nodes is unavailable, wherein the first processor-based node is a primary session node that maintains a primary copy of client session data for the client device; and responsive to determining that the first processor-based node is unavailable, sending, by the load-balancing device, the client request to a second processor-based node of the plurality of interconnected processor-based nodes, wherein the second processor-based node is unaffiliated with the client session data for the client device.

Example 9 is the method of example 8, further comprising: receiving, by the second processor-based node, the client request from the load-balancing device; identifying, by the second processor-based node, a third processor-based node of the plurality of interconnected processor-based nodes as a secondary session node that maintains a backup copy of the client session data for the client device; and sending, by the second processor-based node, the client request to the third processor-based node.

Example 10 is the method of example 9, wherein identifying the third processor-based node as the secondary session node comprises identifying the third processor-based node based on the client session identifier of the client request.

Example 11 is the method of example 9, further comprising: receiving, by the third processor-based node, the client request from the second processor-based node; generating, by the third processor-based node, a response based on the backup copy of the client session data for the client device maintained by the third processor-based node, wherein the response comprises the client request identifier; and sending, by the third processor-based node, the response to the load-balancing device.

Example 12 is the method of example 11, wherein generating the response comprises accessing the backup copy of client session data for the client device based on the client session identifier of the client request.

Example 13 is the method of example 11, further comprising: receiving, by the load-balancing device, the response to the client request from the third processor-based node of the plurality of interconnected processor-based nodes; correlating, by the load-balancing device, the response with the client request based on the client request identifier; and sending, by the load-balancing device, the response to the client device corresponding to the client request based on the client session identifier of the client request.

Example 14 is the method of example 11, wherein: the load-balancing processor-based device is one of a plurality of load-balancing devices; the request header further comprises a load-balancing device identifier uniquely corresponding to the load-balancing device; and sending the response to the load-balancing device is based on the load-balancing device identifier of the client request.

Example 15 is a computer program product stored on a non-transitory computer-readable storage medium and including instructions to cause a processor device to: receive a client request from a client device via a communications network, the client request comprising a client session identifier uniquely corresponding to client session data of the client device; add a request header, comprising a client request identifier uniquely corresponding to the client request, to the client request; determine that a first processor-based node of a plurality of interconnected processor-based nodes of a cluster is unavailable, wherein the first processor-based node is a primary session node that maintains a primary copy of client session data for the client device; and responsive to determining that the first processor-based node is unavailable, send the client request to a second processor-based node of the plurality of interconnected processor-based nodes, wherein the second processor-based node is unaffiliated with the client session data for the client device.

Example 16 is the computer program product of example 14, including instructions to further cause a processor device to: receive the client request; identify a third processor-based node of the plurality of interconnected processor-based nodes as a secondary session node that maintains a backup copy of the client session data for the client device; and send the client request to the third processor-based node.

Example 17 is the computer program product of example 16, wherein to identify the third processor-based node as the secondary session node is to identify the third processor-based node based on the client session identifier of the client request.

Example 18 is the computer program product of example 16, including instructions to further cause a processor device to: receive the client request from the second processor-based node; generate a response based on the backup copy of the client session data for the client device maintained by the third processor-based node, wherein the response comprises the client request identifier; and send the response to a load-balancing device.

Example 19 is the computer program product of example 18, wherein to generate the response is to access the backup copy of client session data for the client device based on the client session identifier of the client request.

Example 20 is the computer program product of example 18, including instructions to further cause a processor device to: receive the response to the client request from the third processor-based node of the plurality of interconnected processor-based nodes; correlate the response with the client request based on the client request identifier; and send the response to the client device corresponding to the client request based on the client session identifier of the client request.

Example 21 is the computer program product of example 18, wherein the request header further comprises a load-balancing device identifier uniquely corresponding to a load-balancing device of a plurality of load-balancing devices; and the computer program product includes instructions to further cause a processor device to send the response to the load-balancing device based on the load-balancing device identifier of the client request.

Example 22 is a computing system, comprising: a means for receiving a client request from a client device via a communications network, the client request comprising a client session identifier uniquely corresponding to client session data of the client device; a means for adding a request header, comprising a client request identifier uniquely corresponding to the client request, to the client request; a means for determining that a first processor-based node of a plurality of interconnected processor-based nodes of a cluster is unavailable, wherein the first processor-based node is a primary session node that maintains a primary copy of client session data for the client device; and a means for sending the client request to a second processor-based node of the plurality of interconnected processor-based nodes, wherein the second processor-based node is unaffiliated with the client session data for the client device, responsive to determining that the first processor-based node is unavailable.

Example 23 is the computing system of example 22, further comprising: a means for receiving the client request from the load-balancing device; a means for identifying a third processor-based node of the plurality of interconnected processor-based nodes as a secondary session node that maintains a backup copy of the client session data for the client device; and a means for sending the client request to the third processor-based node.

Example 24 is the computing system of example 23, wherein the means for identifying the third processor-based node as the secondary session node comprises a means for identifying the third processor-based node based on the client session identifier of the client request.

Example 25 is the computing system of example 23, further comprising: a means for receiving the client request from the second processor-based node; a means for generating a response based on the backup copy of the client session data for the client device maintained by the third processor-based node, wherein the response comprises the client request identifier; and a means for sending the response.

Example 26 is the computing system of example 25, wherein the means for generating the response comprises a means for accessing the backup copy of client session data for the client device based on the client session identifier of the client request.

Example 27 is the computing system of example 25, further comprising: a means for receiving the response to the client request from the third processor-based node of the plurality of interconnected processor-based nodes; a means for correlating the response with the client request based on the client request identifier; and a means for sending the response to the client device corresponding to the client request based on the client session identifier of the client request.

Example 28 is the computing system of example 25, wherein: the request header further comprises a load-balancing device identifier uniquely corresponding to a load-balancing device of a plurality of load-balancing devices; and the means for sending the response comprises a means for sending the response based on the load-balancing device identifier of the client request.

Example 29 is a load-balancing device of a computing system, the load-balancing device to: receive a client request from a client device via a communications network, the client request comprising a client session identifier uniquely corresponding to client session data of the client device; add a request header, comprising a client request identifier uniquely corresponding to the client request, to the client request; determine that a first processor-based node of a plurality of interconnected processor-based nodes of a cluster communicatively coupled to the load-balancing device is unavailable, wherein the first processor-based node is a primary session node that maintains a primary copy of client session data for the client device; and responsive to determining that the first processor-based node is unavailable, send the client request to a second processor-based node of the plurality of interconnected processor-based nodes, wherein the second processor-based node is unaffiliated with the client session data for the client device.

Example 30 is the load-balancing device of example 29, wherein: the load-balancing device is one of a plurality of load-balancing devices of the computing system; and the request header further comprises a load-balancing device identifier uniquely corresponding to the load-balancing device.

Example 31 is the load-balancing device of example 29, further to: receive a response to the client request from a third processor-based node of the plurality of interconnected processor-based nodes, wherein: the third processor-based node is a secondary session node that maintains a backup copy of the client session data for the client device for the client request; and the response comprises the client request identifier; correlate the response with the client request based on the client request identifier; and send the response to the client device corresponding to the client request based on the client session identifier of the client request.

Example 32 is a processor-based node of a plurality of interconnected processor-based nodes of a cluster, the processor-based node to: receive a first client request from a load-balancing device communicatively coupled to the cluster; determine that the processor-based node does not maintain a copy of client session data corresponding to the first client request; identify a secondary session node among the plurality of interconnected processor-based nodes of the cluster, wherein the secondary session node maintains a backup copy of the client session data corresponding to the client request; and send the client request to the secondary session node.

Example 33 is the processor-based node of example 32, wherein identifying the secondary session node comprises identifying the secondary session node based on a client session identifier of the first client request.

Example 34 is the processor-based node of example 32, further to: receive a second client request from an unaffiliated processor-based node of the plurality of interconnected processor-based nodes of the cluster, wherein the unaffiliated processor-based node is unaffiliated with client session data corresponding to the second client request; determine that the processor-based node maintains a backup copy of the client session data corresponding to the second client request; generate a response based on the backup copy of the client session data corresponding to the second client request, wherein the response comprises a client request identifier of the second client request; and send the response to the load-balancing device.

Example 35 is the processor-based node of example 34, wherein: the load-balancing device is one of a plurality of load-balancing devices communicatively coupled to the cluster; and to send the response to the load-balancing device is to send the response based on a load-balancing device identifier of the second client request uniquely corresponding to the load-balancing device.

What is claimed is:

1. A computing system, comprising a load-balancing device configured to be communicatively coupled to a cluster comprising a plurality of interconnected processor-based nodes and to a communications network;
   wherein the load-balancing device is to:
      receive a client request from a client device via the communications network;
      add a request header, comprising a client request identifier uniquely corresponding to the client request, to the client request;
      determine that a first processor-based node of the plurality of interconnected processor-based nodes is unavailable, wherein the first processor-based node is a primary session node that maintains a primary copy of client session data for the client device; and
      responsive to determining that the first processor-based node is unavailable, send the client request to a second processor-based node of the plurality of interconnected processor-based nodes for routing to a secondary session node, wherein the second processor-based node is unaffiliated with the client session data for the client device in that the second processor-based node does not store a copy of client session data corresponding to the client request; and wherein the second processor-based node is to:
  receive the client request from the load-balancing device;
  identify a third processor-based node of the plurality of interconnected processor-based nodes as the secondary session node that maintains a backup copy of the client session data for the client device; and
  send the client request to the third processor-based node.

2. The computing system of claim 1, wherein to identify the third processor-based node as the secondary session node is to identify the third processor-based node based on a client session identifier of the client request.

3. The computing system of claim 1, further comprising the third processor-based node;
  wherein the third processor-based node is to:
    receive the client request from the second processor-based node;
    generate a response based on the backup copy of the client session data for the client device maintained by the third processor-based node, wherein the response comprises the client request identifier; and
    send the response to the load-balancing device.

4. The computing system of claim 3, wherein to generate the response is to access the backup copy of the client session data for the client device based on a client session identifier of the client request.

5. The computing system of claim 3, wherein the load-balancing device is further to:
  receive the response to the client request from the third processor-based node of the plurality of interconnected processor-based nodes;
  correlate the response with the client request based on the client request identifier; and
  send the response to the client device corresponding to the client request based on a client session identifier of the client request.

6. The computing system of claim 5, further comprising a plurality of load-balancing devices including the load-balancing device;
  wherein:
    the request header further comprises a load-balancing device identifier uniquely corresponding to the load-balancing device; and
    the third processor-based node is to send the response to the load-balancing device based on the load-balancing device identifier of the client request.

7. A method, comprising:
  receiving, by a load-balancing device communicatively coupled to a cluster comprising a plurality of interconnected processor-based nodes and to a communications network, a client request from a client device via the communications network;
  adding, by the load-balancing device, a request header, comprising a client request identifier uniquely corresponding to the client request, to the client request;
  determining, by the load-balancing device, that a first processor-based node of the plurality of interconnected processor-based nodes is unavailable, wherein the first processor-based node is a primary session node that maintains a primary copy of client session data for the client device;
  responsive to determining that the first processor-based node is unavailable, sending, by the load-balancing device, the client request to a second processor-based node of the plurality of interconnected processor-based nodes for routing to a secondary session node, wherein the second processor-based node is unaffiliated with the client session data for the client device in that the second processor-based node does not store a copy of client session data corresponding to the client request;
  receiving, by the second processor-based node, the client request from the load-balancing device;
  identifying, by the second processor-based node, a third processor-based node of the plurality of interconnected processor-based nodes as the secondary session node that maintains a backup copy of the client session data for the client device; and
  sending, by the second processor-based node, the client request to the third processor-based node.

8. The method of claim 7, wherein identifying the third processor-based node as the secondary session node comprises identifying the third processor-based node based on a client session identifier of the client request.

9. The method of claim 7, further comprising:
  receiving, by the third processor-based node, the client request from the second processor-based node;
  generating, by the third processor-based node, a response based on the backup copy of the client session data for the client device maintained by the third processor-based node, wherein the response comprises the client request identifier; and
  sending, by the third processor-based node, the response to the load-balancing device.

10. The method of claim 9, wherein generating the response comprises accessing the backup copy of the client session data for the client device based on a client session identifier of the client request.

11. The method of claim 9, further comprising:
  receiving, by the load-balancing device, the response to the client request from the third processor-based node of the plurality of interconnected processor-based nodes;
  correlating, by the load-balancing device, the response with the client request based on the client request identifier; and
  sending, by the load-balancing device, the response to the client device corresponding to the client request based on a client session identifier of the client request.

12. The method of claim 9, wherein:
  the load-balancing processor-based device is one of a plurality of load-balancing devices;
  the request header further comprises a load-balancing device identifier uniquely corresponding to the load-balancing device; and
  sending the response to the load-balancing device is based on the load-balancing device identifier of the client request.

13. A computer program product stored on a non-transitory computer-readable storage medium and including computer-executable instructions that, when executed, cause one or more processor devices to:
  receive a client request from a client device via a communications network;
  add a request header, comprising a client request identifier uniquely corresponding to the client request, to the client request;
  determine that a first processor-based node of a plurality of interconnected processor-based nodes of a cluster is unavailable, wherein the first processor-based node is a primary session node that maintains a primary copy of client session data for the client device;
  responsive to determining that the first processor-based node is unavailable, send the client request to a second processor-based node of the plurality of interconnected processor-based nodes for routing to a secondary session node, wherein the second processor-based node is unaffiliated with the client session data for the client device in that the second processor-based node does not store a copy of client session data corresponding to the client request;

receive the client request;

identify a third processor-based node of the plurality of interconnected processor-based nodes as the secondary session node that maintains a backup copy of the client session data for the client device; and send the client request to the third processor-based node.

14. The computer program product of claim 13, wherein to identify the third processor-based node as the secondary session node is to identify the third processor-based node based on a client session identifier of the client request.

15. The computer program product of claim 13, wherein the computer-executable instructions further cause the one or more processor devices to:

receive the client request from the second processor-based node;

generate a response based on the backup copy of the client session data for the client device maintained by the third processor-based node, wherein the response comprises the client request identifier; and send the response to a load-balancing device.

16. The computer program product of claim 15, wherein to generate the response is to access the backup copy of client session data for the client device based on a client session identifier of the client request.

17. The computer program product of claim 15, wherein the computer-executable instructions further cause the one or more processor devices to:

receive the response to the client request from the third processor-based node of the plurality of interconnected processor-based nodes;

correlate the response with the client request based on the client request identifier; and send the response to the client device corresponding to the client request based on a client session identifier of the client request.

* * * * *